US012500351B2

(12) United States Patent
Du et al.

(10) Patent No.: US 12,500,351 B2
(45) Date of Patent: Dec. 16, 2025

(54) FEED NETWORK, ANTENNA APPARATUS, AND COMMUNICATION DEVICE

(71) Applicant: HUAWEI TECHNOLOGIES CO., LTD., Guangdong (CN)

(72) Inventors: Zijing Du, Xi'an (CN); Chao Wu, Xi'an (CN); Xiaoxiao Wang, Shenzhen (CN); Weihong Xiao, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 64 days.

(21) Appl. No.: 18/639,920

(22) Filed: Apr. 18, 2024

(65) Prior Publication Data

US 2024/0266751 A1 Aug. 8, 2024

Related U.S. Application Data

(63) Continuation of application No. PCT/CN2022/121476, filed on Sep. 26, 2022.

(30) Foreign Application Priority Data

Nov. 11, 2021 (CN) ......................... 202111333089.X

(51) Int. Cl.
*H01Q 21/00* (2006.01)
*H01P 3/08* (2006.01)
(Continued)

(52) U.S. Cl.
CPC ......... *H01Q 21/0075* (2013.01); *H01P 3/081* (2013.01); *H01Q 19/104* (2013.01); *H01Q 21/24* (2013.01)

(58) Field of Classification Search
CPC .. H01Q 21/0075; H01Q 19/104; H01Q 21/24; H01P 3/081
See application file for complete search history.

(56) References Cited

U.S. PATENT DOCUMENTS 5,554,995 A * 9/1996 Jun ...................... H01Q 21/065 343/846
10,581,177 B2 * 3/2020 Isom ...................... H01P 5/227
(Continued)

FOREIGN PATENT DOCUMENTS

CN 106654557 A 5/2017
CN 105789802 B 9/2018
(Continued)

*Primary Examiner* — Hai V Tran

(57) ABSTRACT

This disclosure provides a feed network, an antenna apparatus, and a communication device. A main portion is disposed with a first electric-conductor and a second electric-conductor. In addition, two branch portions are disposed, one end of a first branch portion is electrically connected to the first electric-conductor, and one end of a second branch portion is electrically connected to the second electric-conductor. In this way, when two radiation parts in a same polarization direction of a radiating element are electrically connected to the first branch portion and the second branch portion respectively, a transmission structure of the feed network may feed two radio frequency signals, for example, two equi-amplitude phase-inverted radio frequency signals, into the two radiation parts of the radiating element respectively. The feed network in this embodiment of this application has a simple line, so that space occupied by the feed network in the antenna apparatus is reduced.

20 Claims, 8 Drawing Sheets

(51) Int. Cl.
*H01Q 19/10* (2006.01)
*H01Q 21/24* (2006.01)

(56) References Cited

U.S. PATENT DOCUMENTS

| | | | | |
|---|---|---|---|---|
| 2020/0099130 A1* | 3/2020 | Daojian | .................... | H01Q 1/48 |
| 2020/0220252 A1* | 7/2020 | Xiao | ....................... | H01Q 19/10 |
| 2020/0259248 A1* | 8/2020 | Lv | ........................... | H01Q 21/28 |

FOREIGN PATENT DOCUMENTS

| | | |
|---|---|---|
| JP | H11340711 A | 12/1999 |
| JP | 2004242277 A | 8/2004 |

* cited by examiner

FEED NETWORK, ANTENNA APPARATUS, AND COMMUNICATION DEVICE

CROSS-REFERENCE TO RELATED APPLICATIONS

This application is a continuation of International Patent Application No. PCT/CN2022/121476, filed on Sep. 26, 2022, which claims priority to Chinese patent application Ser. No. 202111333089.X, filed on Nov. 11, 2021. The disclosures of the aforementioned applications are hereby incorporated by reference in their entireties.

TECHNICAL FIELD

Embodiments of this disclosure relate to the field of antenna technologies, and in particular, to a feed network, an antenna apparatus, and a communication device.

BACKGROUND

With wide application and development of a 5th generation (5G for short) technology, a base station antenna develops towards a plurality of frequency bands and a plurality of arrays, and integration of the antenna is increasingly high. Generally, a base station array antenna includes a plurality of radiating elements and a plurality of feed networks, and each radiating element is electrically connected to a feed network corresponding to the radiating element, so that the radiating element receives or sends a radio frequency signal by using the feed network of the radiating element.

In a related technology, the feed network of the antenna includes a transmission structure. One end of the transmission structure is electrically connected to a radio frequency signal port, and the other end of the transmission structure is divided into two branches. One branch is directly electrically connected to a part of the radiating element, for example, a dipole arm, to transmit a radio frequency signal with a phase of 0° to the dipole arm. The other branch is reversely coupled to a coupling member, so that a phase of an intersection line formed by the branch and the coupling member is 180°. In addition, the intersection line is electrically connected to a part of the radiating element, for example, another dipole arm, to transmit a radio frequency signal with a phase of 180° to the dipole arm, so that the feed network feeds equi-amplitude phase-inverted radio frequency signals into the two dipole arms of the radiating element.

However, in the foregoing antenna, a line of the transmission structure in the feed network is complex, resulting in a large signal loss. In addition, a size of the transmission structure in the feed network is large, increasing space occupied by the feed network in the antenna.

SUMMARY

Embodiments of this disclosure provide a feed network, an antenna apparatus, and a communication device. The feed network can communicate an equi-amplitude phase-inverted radio frequency signal with a radiating element, and a line is simple, to reduce a signal loss and a space size of the feed network.

According to a first aspect, an embodiment of this disclosure provides a feed network, including a transmission structure, where the transmission structure includes a main portion and two branch portions, the main portion has a first electric-conductor and a second electric-conductor that are disposed opposite to each other, and there is a spacing between the first electric-conductor and the second electric-conductor. The two branch portions include a first branch portion and a second branch portion, where one end of the first branch portion is electrically connected to one end of the first electric-conductor, and the other end of the first branch portion is electrically connected to a first radiation part of a radiating element in an antenna apparatus, to feed a radio frequency signal into the first radiation part; one end of the second branch portion is electrically connected to the second electric-conductor, and the other end of the second branch portion is electrically connected to a second radiation part of the radiating element, to feed a radio frequency signal into the second radiation part; and the first radiation part and the second radiation part are two radiation parts in a same polarization direction in the radiating element.

In this embodiment of this disclosure, the main portion is disposed with the first electric-conductor and the second electric-conductor. In addition, the two branch portions are disposed, one end of the first branch portion is electrically connected to the first electric-conductor, and one end of the second branch portion is electrically connected to the second electric-conductor. In this way, when the two radiation parts in the same polarization direction in the radiating element are electrically connected to the first branch portion and the second branch portion respectively, the transmission structure may feed radio frequency signals into the two radiation parts of the radiating element via the first branch portion and the second branch portion respectively. For example, when the first electric-conductor and the second electric-conductor respectively transmit equi-amplitude phase-inverted radio frequency signals, the transmission structure may feed equi-amplitude phase-inverted radio frequency signals into the two radiation parts via the first branch portion and the second branch portion respectively. In one aspect, arrangement of the feed network ensures radiation performance of the radiating element. In another aspect, compared with a feed network in a related technology, the feed network in this embodiment of this disclosure has a simple line, so that a signal loss of the feed network is reduced, and a size of the feed network is also reduced, to reduce space occupied by the feed network in the antenna apparatus, and provide proper space for disposing an array antenna. In addition, the feed network in this embodiment of this disclosure is also easy to be manufactured, thereby improving manufacturing efficiency of the feed network.

In a feasible implementation, the main portion includes a microstrip, the first electric-conductor is an inner conductor of the microstrip, and the second electric-conductor is an outer conductor of the microstrip.

In this embodiment of this disclosure, the main portion is set as a microstrip structure, and an equi-amplitude phase-inverted feature of the inner conductor and the outer conductor in the microstrip structure is properly used, so that one end of the first branch portion and one end of the second branch portion are electrically connected to the inner conductor and the outer conductor respectively. Therefore, when the other end of the first branch portion and the other end of the second branch portion are electrically connected to the radiating element, equi-amplitude phase-inverted radio frequency signals can be fed into two parts of the radiating element. In addition, a structure of the main portion is also simplified by setting the main portion as the microstrip structure, to simplify a structure of a connection between the main portion and the two branch portions, and improve manufacturing efficiency of the entire feed network.

In a feasible implementation, the feed network further includes a substrate, where the substrate includes a first surface and a second surface that are disposed opposite to each other, the first electric-conductor is located on the first surface, the second electric-conductor is located on the second surface, a part of the first branch portion and a part of the second branch portion are located on the first surface, and the other part of the first branch portion and the other part of the second branch portion are located on the second surface.

The substrate is used as an intermediate dielectric layer of the microstrip structure, so that the first electric-conductor and the second electric-conductor are stably disposed on surfaces of two sides of the substrate, to improve structural stability of the main portion. In addition, the part of the first branch portion and the part of the second branch portion are also disposed on the first surface, and the other part of the first branch portion and the other part of the second branch portion are disposed on the second surface, to properly use space of the two surfaces of the substrate, and avoid a case in which the first branch portion and the second branch portion are concentrated on one surface and interfere with another component or circuit wiring on the surface.

In a feasible implementation, the first branch portion includes a first part and a second part, one end of the first part is electrically connected to the first electric-conductor, the other end of the first part is electrically connected to the second part, and the other end of the second part is electrically connected to the first radiation part. A projection of the first part and a projection of the second electric-conductor overlap in a direction perpendicular to the substrate, and a projection of the second part and the projection of the second electric-conductor are staggered in the direction perpendicular to the substrate.

The projection of the first part and the projection of the second electric-conductor overlap in the direction perpendicular to the substrate, that is, a projection region of the first part of the first branch portion on the second surface is located inside the second electric-conductor, so that the first part of the first branch portion and the second electric-conductor form a partial microstrip structure, to improve an impedance match effect of the first branch portion.

In a feasible implementation, the second branch portion includes a third part and a fourth part, the third part is electrically connected to the second electric-conductor, one end of the fourth part is electrically connected to the third part, and the other end of the fourth part is electrically connected to the second radiation part. A projection of the third part and the projection of the second electric-conductor overlap in the direction perpendicular to the substrate, and a projection of the fourth part and the projection of the second electric-conductor are staggered in the direction perpendicular to the substrate.

The projection of the third part and the projection of the second electric-conductor overlap in the direction perpendicular to the substrate, that is, a projection region of the third part on the second surface is located inside the second electric-conductor, so that the third part of the second branch portion and the second electric-conductor form a microstrip structure, to improve an impedance match effect of the second branch portion.

In a feasible implementation, the transmission structure further includes two electrical connectors. The two electrical connectors and the two branch portions are correspondingly disposed, each electrical connector is electrically connected to an end that is of a corresponding branch portion and that is away from the main portion, and a corresponding part in the radiating element is electrically connected to a corresponding electrical connector. In addition, a size of each electrical connector in an extension direction perpendicular to the branch portion is greater than a width of the branch portion.

In this embodiment of this disclosure, one end of each branch portion is electrically connected to an electrical connector, and a size of the electrical connector in an extension direction perpendicular to the branch portion is set to be greater than a width of the branch portion. In this way, an area of an electrical connection between the transmission structure and the radiating element can be increased, to ensure reliability of the electrical connection between the transmission structure of the feed network and the radiating element.

In a feasible implementation, each electrical connector includes two electrical sub-connectors disposed opposite to each other in the direction perpendicular to the substrate, one electrical sub-connector is disposed on the first surface of the substrate, and the other electrical sub-connector is disposed on the second surface of the substrate. The two electrical sub-connectors are electrically connected, and the radiating element is electrically connected to any electrical sub-connector in the corresponding electrical connector, to improve manner flexibility of a connection between the radiating element and the electrical connector. For example, the radiating element may be connected to the electrical sub-connector on the first surface, or may pass through the electrical connector and be connected to the electrical sub-connector on the second surface. In this way, when a radiator of the radiating element is located on the first surface, a feeding member of the radiating element may pass through the electrical connector and be welded to the electrical sub-connector on the second surface, to avoid spatial interference caused by the radiator to a welding process and avoid affecting welding efficiency.

In a feasible implementation, the feed network includes two transmission structures, and the two transmission structures include a first transmission structure and a second transmission structure.

The first transmission structure includes a first electrical connector and a third electrical connector, the first electrical connector is electrically connected to a first branch portion of the first transmission structure, and the third electrical connector is electrically connected to a second branch portion of the first transmission structure, so that the first transmission structure can transmit equi-amplitude phase-inverted first radio frequency signals to a pair of symmetric parts of the radiating element via the first electrical connector and the third electrical connector. The second transmission structure includes a second electrical connector and a fourth electrical connector, the second electrical connector is electrically connected to a first branch portion of the second transmission structure, and the fourth electrical connector is electrically connected to a second branch portion of the second transmission structure, so that the second transmission structure can transmit equi-amplitude phase-inverted second radio frequency signals to another pair of symmetric parts of the radiating element via the second electrical connector and the fourth electrical connector. It may be understood that polarization directions of the first radio frequency signal transmitted by the first transmission structure and the second radio frequency signal transmitted by the second transmission structure may be different, so that dual-polarized feeding of the feed network to the radiating element is implemented.

The first electrical connector, the second electrical connector, the third electrical connector, and the fourth electrical connector are sequentially arranged in a ring shape, to ensure that each electrical connector corresponds to a corresponding part of the radiating element in the direction perpendicular to the substrate, simplify an electrical connection path between the radiating element and each electrical connector, simplify a connection line between the radiating element and each electrical connector, and improve manufacturing efficiency of the antenna apparatus.

In a feasible implementation, both the second branch portion and the first part of the first branch portion are located on the first surface of the substrate, so that the second branch portion, the first part of the first branch portion, and the first electric-conductor are all disposed on the first surface of the substrate. In this way, a process of disposing the second branch portion and the first part of the first branch portion on the substrate can be simplified, that is, the second branch portion, the first part of the first branch portion, and the first electric-conductor may be all printed on the first surface of the substrate. At least a part of the second part of the first branch portion is located on the second surface of the substrate, to save partial space of the first surface, and provide proper disposing space for the electrical connector, for example, the electrical sub-connector on the first surface.

In a feasible implementation, the second part of the first branch portion includes a first extension portion and a first bent portion. One end of the first extension portion is electrically connected to the first part, the other end of the first extension portion is electrically connected to one end of the first bent portion, and the other end of the second bent portion is electrically connected to the first radiation part.

In this embodiment of this disclosure, a part of the first branch portion is set as a bent portion, to extend an extension length of the first branch portion. Because the first branch portion is electrically connected to the radiating element, in an actual application, the first branch portion may be considered as an extension part of the radiating element. A length of the first branch portion is extended to increase an area of the radiating element, so that a radiation bandwidth of the radiating element may be increased. For example, a low frequency of the radiating element may be moved to a low frequency.

In a feasible implementation, at least a part of the first bent portion and at least a part of the second branch portion are located between the third electrical connector and the second electrical connector of the feed network, and at least a part of the first bent portion is located on the second surface, to ensure that both the part of the first bent portion and the part of the second branch portion can be centralized between the third electrical connector and the second electrical connector, thereby providing proper disposing space for disposing another component on the substrate.

In a feasible implementation, the fourth part of the second branch portion includes a second extension portion and a second bent portion, a first end of the second extension portion is connected to the third part of the second branch portion, a second end of the second extension portion is connected to the second bent portion, and the other end of the second bent portion is electrically connected to the second radiation part.

In this embodiment of this disclosure, a part of the second branch portion is set as a bent portion, to extend an extension length of the second branch portion. Because the second branch portion is electrically connected to the radiating element, in an actual application, the second branch portion may be considered as an extension part of the radiating element. A length of the second branch portion is extended to increase an area of the radiating element, so that a radiation bandwidth of the radiating element may be increased. For example, a low frequency of the radiating element may be moved to a low frequency.

In a feasible implementation, the second bent portion and the first bent portion have an overlapping region in the direction perpendicular to the substrate, and the overlapping region is located between the second electrical connector and the third electrical connector of the feed network, or the overlapping region is located between the first electrical connector and the fourth electrical connector of the feed network, to ensure that the second bent portion is between adjacent electrical sub-connectors on the first surface, and also ensure that the first bent portion is between adjacent electrical sub-connectors on the second surface. In this way, the second bent portion and the first bent portion are both centralized between two adjacent electrical connectors, to save other space on the substrate, and facilitate layout of another component or a line.

According to a second aspect, an embodiment of this disclosure further provides an antenna apparatus, including a radiating element and the foregoing feed network.

The radiating element is electrically connected to a transmission structure of the feed network.

In this embodiment of this disclosure, the foregoing feed network is disposed in the antenna apparatus. In one aspect, the feed network is disposed to ensure radiation performance of the antenna apparatus. In another aspect, compared with a feed network in a related technology, the feed network in this embodiment of this disclosure has a simple line, to reduce a signal loss of the feed network, reduce a size of the feed network, reduce space occupied by the feed network in the antenna apparatus, and provide proper space for the antenna apparatus to be disposed as an array antenna. That is, on the basis of improving integration of the antenna apparatus, miniaturization of the antenna apparatus is ensured. In addition, a structure of the feed network in the antenna apparatus is also simplified, to improve manufacturing efficiency of the antenna apparatus.

In a feasible implementation, the antenna apparatus further includes a reflection plate. Both the feed network and the radiating element are located on a same side of the reflection plate. The reflection plate has a through hole, and in the feed network, an orthographic projection region of at least a part of a branch portion and at least a part of an electrical connector on the reflection plate is located in the through hole.

The through hole is provided on a part that is of the reflection plate and that corresponds to the branch portion and the electrical connector, to avoid coupling between at least the part of the branch portion and at least the part of the electrical connector and the reflection plate that serves as a reference ground, and ensure that current amplitudes on two branch portions of one transmission structure and corresponding electrical connectors are equal.

According to a third aspect, an embodiment of this disclosure further provides a communication device, including the foregoing antenna apparatus.

In this embodiment of this disclosure, the foregoing antenna apparatus is disposed in the communication device such as a base station device. In one aspect, signal sending and receiving performance of the communication device is ensured. In another aspect, compared with the antenna apparatus in the related technology, the antenna apparatus in this embodiment of this disclosure has a simple structure, is easy to manufacture, and occupies small space. In this way, the array antenna may be disposed in the communication device, that is, integration of the communication device is improved on the basis of ensuring that a size of the communication device is within a proper range.

DESCRIPTIONS OF REFERENCE NUMERALS

Figure 1:
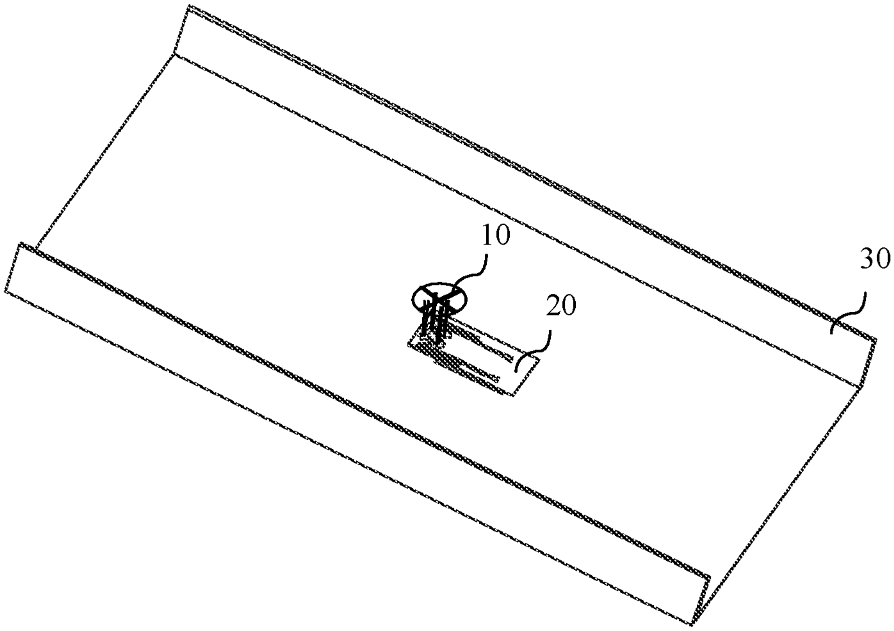
FIG. 1 is a diagram of a structure of an antenna apparatus according to an embodiment of this disclosure.

- 10—radiating element; 20 and 20*a*—feed network; 30—reflection plate;
- 11—radiator; 12—feeding member; 201 and 211—main portion; 202—first branch; 203—second branch; 204—coupling member; 21—transmission structure; 22—substrate; 31—through hole;
- 111—first dipole arm; 112—second dipole arm; 113—third dipole arm; 114—fourth dipole arm; 111*a*—first region; 112*a*—second region; 113*a*—third region; 114*a*—fourth region; 111*b*—first monopole; 112*b*—second monopole; 113*b*—third monopole; 114*b*—fourth monopole; 203*a*—first stub; 203*b*—first connecting portion; 204*a*—second stub; 204*b*—second connecting portion;
- 21*a*—first transmission structure; 21*b*—second transmission structure; 212—branch portion; 213—electrical connector; 214—metal via hole; 221—first surface; 222—second surface;
- 211*a*—first electric-conductor; 211*b*—second electric-conductor; 212*a*—first branch portion; 212*b*—second branch portion; 213*a*—electrical sub-connector; 2131—first electrical connector; 2132—second electrical connector; 2133—third electrical connector; 2134—fourth electrical connector;
- 2121—first part; 2122—second part; 2123—third part; 2124—fourth part;
- 2125—first extension portion; 2126—first bent portion; 2127—second extension portion; 2128—second bent portion; and
- 2129—fifth part; 2130—sixth part.

DESCRIPTION OF EMBODIMENTS

Terms used in embodiments of this disclosure are only used to explain specific embodiments of this disclosure, but are not intended to limit this disclosure.

An embodiment of this disclosure provides a communication device. The communication device may be a communication base station, for example, a public mobile communication base station. The communication device, for example, the communication base station, is an interface device for a mobile device to access the Internet, and is also a form of a radio station. In a specific radio coverage region, information transfer is performed on the mobile device through the communication base station, that is, a mobile communication switching center.

The communication base station is used as an example. A main component for information transfer between the communication base station and the mobile device is an antenna system. Generally, the antenna system includes an antenna apparatus, a mounting bracket, a pole, a grounding apparatus, and the like, where the antenna apparatus is fastened on the pole via the mounting bracket. In an actual application, a position and an installation angle of the antenna apparatus on the pole may be adjusted by adjusting a position and an angle of the mounting bracket.

In addition, one end of the antenna apparatus may be further connected to the grounding apparatus via a connector, to ensure that the antenna apparatus is grounded. A connector sealing piece is provided at one end that is of the connector and that is connected to the antenna apparatus and the other end that is of the connector and that is connected to the grounding apparatus, to ensure sealing of connections of the two ends of the connector to the antenna apparatus and the grounding apparatus. It may be understood that the connector sealing piece may be an insulation sealing tape, for example, a polyvinyl chloride (PVC for short) insulation tape.

In a specific application, the antenna system is usually located in a radome. The radome is a mechanical part that protects the antenna system from an external environment, and has a good electromagnetic wave penetration feature in terms of electrical performance and can withstand a harsh external environment in terms of mechanical performance. The antenna system is protected by using the radome, to prevent the antenna system from being damaged due to dust or water.

Figure 2:
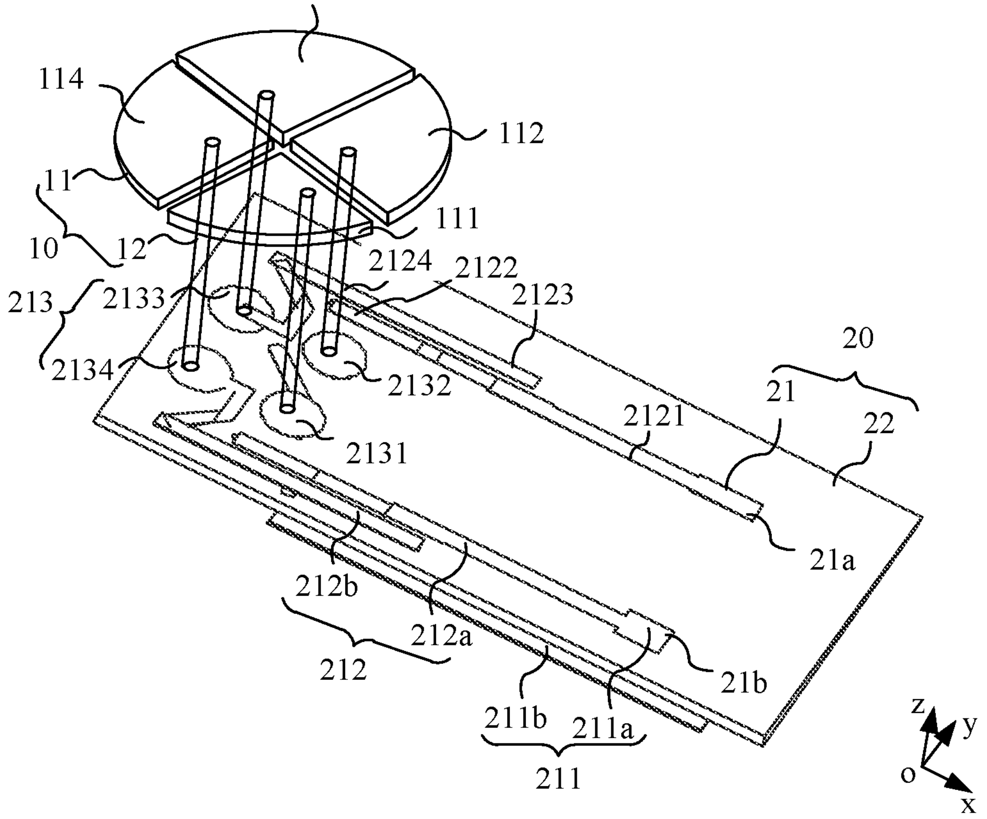
FIG. 2 is a diagram of a structure of the feed network and the radiating element in FIG. 1.

FIG. 1 is a diagram of a structure of an antenna apparatus according to an embodiment of this disclosure. FIG. 2 is a diagram of a structure of the feed network and the radiating element in FIG. 1. Refer to FIG. 1 and FIG. 2. The antenna apparatus in this embodiment of this disclosure includes a radiating element 10 and a feed network 20.

The feed network 20 feeds a radio frequency signal to the radiating element 10 based on a specific amplitude and phase, or sends a received radio signal to a signal processing unit of a communication device such as a communication base station based on a specific amplitude and phase.

Specifically, one end of the feed network 20 is electrically connected to the radiating element 10, and the other end of the feed network 20 is electrically connected to a radio frequency circuit (not shown in the figure), so that a radio frequency signal is communicated between the radiating element 10 and the radio frequency circuit. For example, the other end of the feed network 20 is electrically connected to a radio frequency signal port in the radio frequency circuit.

When the antenna apparatus is a transmit antenna, the radio frequency circuit may provide a signal source for the antenna apparatus. For example, the other end of the feed network 20 may be electrically connected to the radio frequency signal port in the radio frequency circuit, so that the radio frequency signal port sends a radio frequency signal, and feeds the radio frequency signal into the radiating element 10 in a form of a current. Then, the radiating element 10 sends the radio frequency signal in a form of an electromagnetic wave, and the radio frequency signal is received by a receive antenna in the mobile device.

When the antenna apparatus is a receive antenna, the radio frequency circuit may receive a radio frequency signal fed back by the antenna apparatus. For example, the radiating element 10 of the antenna apparatus converts a received electromagnetic wave signal into a current signal, and then transmits the current signal to the radio frequency circuit by using the feed network 20, and then the signal processing unit performs subsequent processing.

The radio frequency circuit includes a remote radio unit (RRU for short), that is, a part of a remote radio unit radio frequency circuit, and the radio frequency signal port is usually disposed in the remote radio unit. For specific circuit settings and a working principle of the radio frequency circuit, directly refer to related content in a conventional technology. Details are not described herein.

In an actual application, with wide application and development of a 5G technology, a base station antenna develops towards a plurality of frequency bands and a plurality of arrays, and integration of the antenna apparatus is increasingly high. For example, the antenna apparatus may include a plurality of radiating elements 10 and a plurality of feed networks 20, and the feed networks 20 and the radiating elements 10 are disposed in one-to-one correspondence, so that the antenna apparatus forms an array antenna. Each radiating element 10 is electrically connected to a feed network 20 corresponding to the radiating element 10, so that each radiating element 10 is electrically connected to the radio frequency circuit by using the respective feed network 20, and each radiating element 10 receives or sends a radio frequency signal.

Refer to FIG. 1. The antenna apparatus further includes a reflection plate 30, and both the feed network 20 and the radiating element 10 are located on a same side of the reflection plate 30, to improve receiving sensitivity of the antenna apparatus to an electromagnetic wave signal. For example, the electromagnetic wave signal may be aggregated on the radiating element 10 of the receive antenna through reflection, which greatly enhances a receiving or transmitting capability of the antenna apparatus, and further blocks and shields interference of another electromagnetic wave from a back (in a reverse direction) of the reflection plate 30 to a received signal.

When the antenna apparatus is an array antenna, the plurality of radiating elements 10 are arranged on the reflection plate 30 at an interval by array, that is, the antenna array is formed on the reflection plate 30. An arrangement manner of the plurality of radiating elements 10 is not specifically limited in this embodiment of this disclosure.

Refer to FIG. 2. The feed network 20 includes a controlled impedance transmission structure 21. In an actual application, the feed network 20 further includes a phase shifter connected to the transmission structure 21. The phase shifter is configured to implement real-time change of network coverage, and adjust a signal phase to implement electrical downtilt of the array antenna. In addition, the feed network 20 may further include a module configured to extend performance, such as a filter and a combiner. The phase shifter, the filter, and the combiner are not specifically described in this embodiment of this disclosure. For details, refer to related content in the conventional technology.

According to the antenna apparatus in this embodiment of this disclosure, equi-amplitude phase-inverted radio frequency signals may be transmitted to a pair of radiation parts in the radiating element 10 by using the transmission structure 21 of the feed network 20. Generally, a pair of radiation parts in the radiating element 10 may be a pair of symmetric radiation parts, for example, two symmetric dipole arms. For example, the radiating element 10 includes a radiator 11, and the radiator 11 has at least one pair of symmetric two radiation parts. The two radiation parts may be a first radiation part and a second radiation part respectively. The transmission structure 21 of the feed network 20 is electrically connected to the symmetric two parts, that is, the transmission structure 21 is electrically connected to the first radiation part and the second radiation part, to feed equi-amplitude phase-inverted radio frequency signals to the symmetric first radiation part and second radiation part.

It may be understood that the pair of symmetric two radiation parts, for example, the first radiation part and the second radiation part, are respectively two radiation parts in a same polarization direction of the radiating element 10.

The equi-amplitude phase-inverted radio frequency signals are radio frequency signals with equal current amplitudes and inverted phases. It may be understood that, the equi-amplitude phase-inverted radio frequency signals are respectively fed into the pair of symmetric two radiation parts in the radiating element 10, to ensure impedance match of the symmetric parts in the radiating element 10, thereby improving radiation performance of the radiating element 10.

Figure 3:
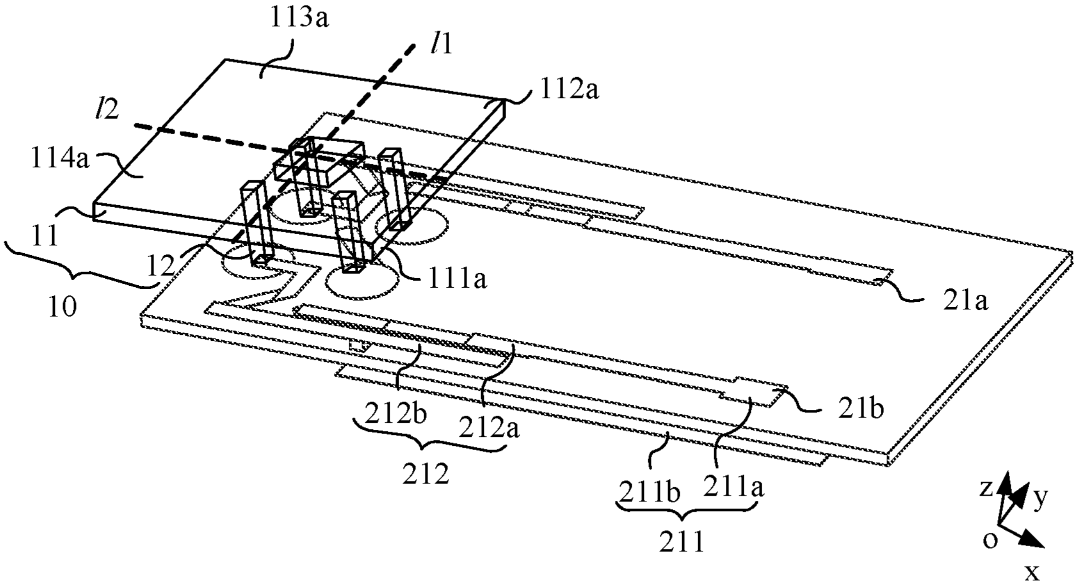
FIG. 3 is another diagram of a structure of the feed network and the radiating element in FIG. 1.
Figure 4:
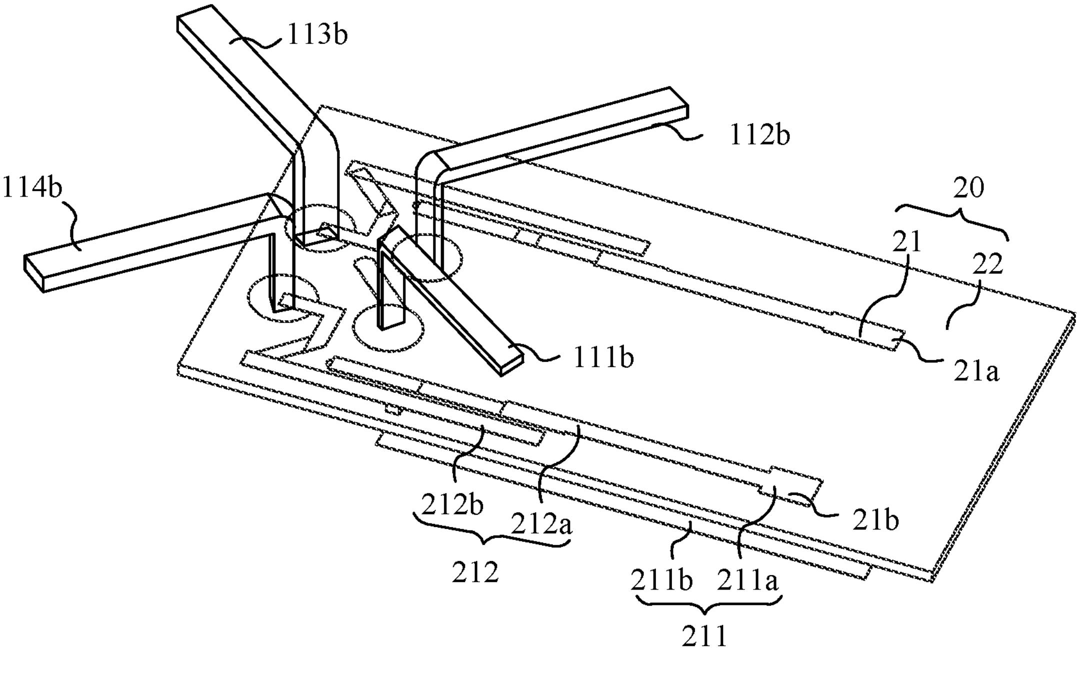
FIG. 4 is still another diagram of a structure of the feed network and the radiating element in FIG. 1.

FIG. 3 is another diagram of a structure of the feed network and the radiating element in FIG. 1. FIG. 4 is still another diagram of a structure of the feed network and the radiating element in FIG. 1. Refer to FIG. 1 to FIG. 3. It should be noted that the antenna apparatus in this embodiment of this disclosure may include but is not limited to an antenna, such as a dipole antenna, a patch antenna, or a monopole antenna, to which equi-amplitude phase-inverted radio frequency signals need to be fed.

Refer to FIG. 2. For example, the antenna apparatus may be the dipole antenna, and the radiating element 10 of the antenna apparatus may include four dipole arms arranged in a ring shape. It may be understood that the four dipole arms jointly form the radiator 11 of the dipole antenna.

There are two transmission structures 21 in the feed network 20. One end of one transmission structure 21 is electrically connected to a radio frequency signal port, and the other end of the transmission structure 21 is electrically connected to a pair of opposite two dipole arms in the radiating element 10, so that radio frequency signals are communicated between the radio frequency signal port and the pair of opposite two dipole arms in the radiating element 10. One end of the other transmission structure 21 is electrically connected to the radio frequency signal port, and the other end of the transmission structure 21 is electrically connected to another pair of opposite two dipole arms, so that radio frequency signals are communicated between the radio frequency signal port and the another pair of opposite two dipole arms.

It may be understood that, when the antenna apparatus is a dual-polarized antenna, there are two radio frequency signal ports in the radio frequency circuit, which are respectively a first radio frequency signal port and a second radio frequency signal port. The first radio frequency signal port may be electrically connected to a pair of opposite dipole arms in the radiating element 10 by using one transmission structure 21. In this way, the first radio frequency signal port may feed radio frequency signals in a first polarization direction into the pair of opposite dipole arms by using the transmission structures 21. The second radio frequency signal port may be electrically connected to another pair of opposite dipole arms in the radiating element 10 by using the other transmission structure 21. In this way, the second radio frequency signal port may feed radio frequency signals in a second polarization direction into the another pair of opposite dipole arms by using the other transmission structure 21, to implement dual-polarized feeding of the feed network 20, so that the radiating element 10 becomes a dual-polarized radiating element 10.

Refer to FIG. 2. For ease of description, the following uses an example in which the radiating element 10 has four dipole arms for description. The four dipole arms are respectively a first dipole arm 111, a second dipole arm 112, a third dipole arm 113, and a fourth dipole arm 114, and the first dipole arm 111, the second dipole arm 112, the third dipole arm 113, and the fourth dipole arm 114 are disposed at an interval along a circumferential direction of a ring structure.

There may be two transmission structures 21 in the feed network 20. The two transmission structures 21 are respectively a first transmission structure 21*a* and a second transmission structure 21*b*. One end of the first transmission structure 21*a* is electrically connected to the first radio frequency signal port, and the other end of the first transmission structure 21*a* is electrically connected to the first dipole arm 111 and the third dipole arm 113 that are diagonal. In this way, radio frequency signals in the first polarization direction may be transmitted to the first dipole arm 111 and the third dipole arm 113 by using the first transmission structure 21*a*. One end of the second transmission structure 21*b* is electrically connected to the second radio frequency signal port, and the other end of the second transmission structure 21*b* is electrically connected to the second dipole arm 112 and the fourth dipole arm 114 that are diagonal. In this way, radio frequency signals in the second polarization direction may be transmitted to the second dipole arm 112 and the fourth dipole arm 114 by using the second transmission structure 21*b*.

It may be understood that the first polarization direction is different from the second polarization direction. For example, the first polarization direction may be a +45° polarization direction, and the second polarization direction may be a −45° polarization direction.

Radio frequency signals transmitted by one transmission structure 21 to a pair of symmetric dipole arms are equi-amplitude phase-inverted radio frequency signals. For example, the first transmission structure 21*a* may transmit equi-amplitude phase-inverted radio frequency signals to the first dipole arm 111 and the third dipole arm 113 respectively, and polarization directions of the radio frequency signals transmitted to the first dipole arm 111 and the third dipole arm 113 are the same, for example, the radio frequency signals are radio frequency signals in the first polarization direction.

The second transmission structure 21*b* may transmit equi-amplitude phase-inverted radio frequency signals to the second dipole arm 112 and the fourth dipole arm 114 respectively, and polarization directions of the radio frequency signals transmitted to the second dipole arm 112 and the fourth dipole arm 114 are the same, for example, the radio frequency signals are radio frequency signals in the second polarization direction.

Refer to FIG. 3. The antenna apparatus in this embodiment of this disclosure may alternatively be a patch antenna. In other words, the radiating element 10 of the antenna apparatus includes a radiator 11 of the patch antenna. A cross section shape of the radiator 11 is a quadrilateral structure.

Still refer to FIG. 3. In an actual application, the radiator 11 may be divided into four regions along a horizontal plane (as shown in an xoy plane in FIG. 3). For example, the cross section shape of the radiator 11 is a square. The radiator 11 may be divided into four regions along a horizontal symmetry line l1 and a vertical symmetry line l2, and the four regions around a center of the radiator 11 are sequentially a first region 111*a*, a second region 112*a*, a third region 113*a*, and a fourth region 114*a*. The first region 111*a* and the third region 113*a* are two regions on one diagonal, and the second region 112*a* and the fourth region 114*a* are two regions on the other diagonal.

One transmission structure 21 of the feed network 20 is electrically connected to a pair of opposite two regions of the radiator 11, and the other transmission structure 21 is electrically connected to the other pair of opposite two regions. For example, one end of the first transmission structure 21*a* is electrically connected to the first radio frequency signal port, and the other end of the first transmission structure 21*a* is electrically connected to the first region 111*a* and the third region 113*a*. In this way, equi-amplitude phase-inverted radio frequency signals may be respectively transmitted to the first region 111*a* and the third region 113*a* by using the first transmission structure 21*a*, and the radio frequency signals may be radio frequency signals in the first polarization direction.

A first end of the second transmission structure 21*b* is electrically connected to the second radio frequency signal port, and the other end of the second transmission structure 21*b* is electrically connected to the second region 112*a* and the fourth region 114*a*. In this way, equi-amplitude phase-inverted radio frequency signals may be respectively transmitted to the second region 112*a* and the fourth region 114*a* by using the second transmission structure 21*b*, and the radio frequency signals may be radio frequency signals in the second polarization direction.

Refer to FIG. 4. The antenna apparatus may be a monopole antenna. For example, the radiating element 10 includes four monopoles arranged in a ring shape.

One transmission structure 21 of the feed network 20 is electrically connected to a pair of opposite two monopoles, and the other transmission structure 21 is electrically connected to the other pair of opposite two monopoles.

For ease of description, the four monopoles are sequentially a first monopole 111*b*, a second monopole 112*b*, a third monopole 113*b*, and a fourth monopole 114*b* along a circumferential direction. One transmission structure 21, for example, the first transmission structure 21*a*, may be electrically connected to the first monopole 111*b* and the third monopole 113*b* that are diagonal, to respectively transmit equi-amplitude phase-inverted radio frequency signals to the first monopole 111*b* and the third monopole 113*b*. The other transmission structure 21, for example, the second transmission structure 21*b*, may be electrically connected to the third monopole 113*b* and the fourth monopole 114*b* that are diagonal, to respectively transmit equi-amplitude phase-inverted radio frequency signals to the second monopole 112*b* and the fourth monopole 114*b*.

Figure 5:
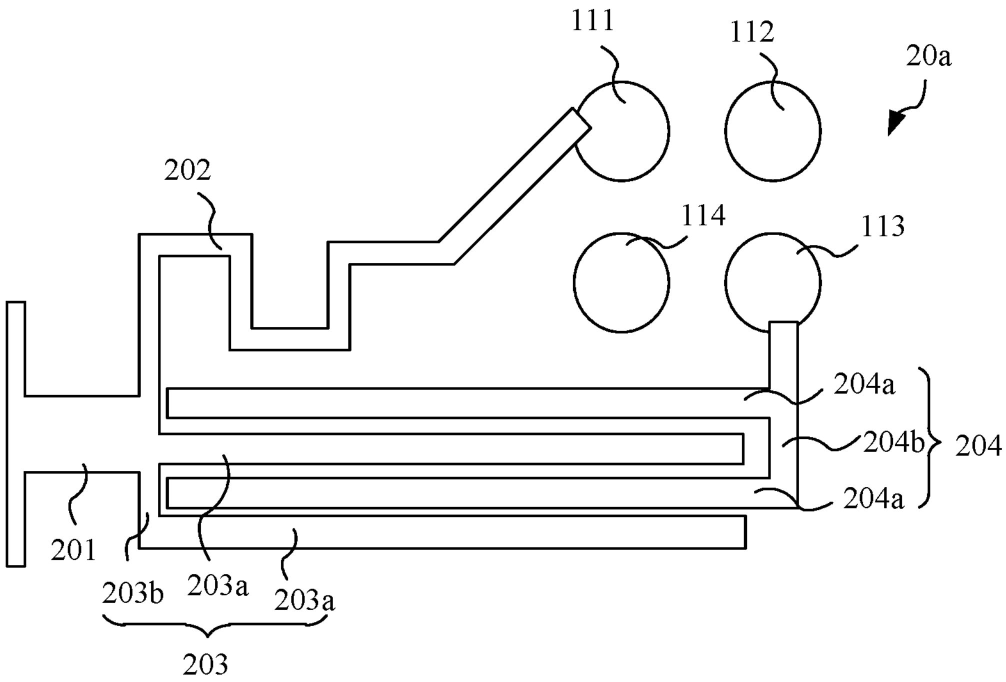
FIG. 5 is a diagram of a structure of a feed network and a radiating element in a related technology.

FIG. 5 is a diagram of a structure of a feed network in a related technology. Refer to FIG. 5. In the related technology, a transmission structure of the feed network 20*a* includes a main portion 201 and two branches located at one end of the main portion 201, and the other end of the main portion 201 is configured to electrically connect to a radio frequency signal port in a radio frequency circuit. In the two branches, one branch is directly electrically connected to a part of a radiating element 10, for example, a first dipole arm 111, to transmit a radio frequency signal with a phase of 0° to the part. The other branch is reversely coupled to a coupling member 204, so that a phase of an intersection line formed by the branch and the coupling member 204 is 180°, and the intersection line is electrically connected to a part of the radiating element 10, for example, a third dipole arm 113, to transmit a radio frequency signal with a phase of 180° to the part, so that the feed network 20 transmits equi-amplitude phase-inverted radio frequency signals to the two parts of the radiating element 10.

Still refer to FIG. 5. An example in which the antenna apparatus is a dipole antenna is used. The radiating element 10 includes four dipole arms, and the four dipole arms are sequentially a first dipole arm 111, a second dipole arm 112, a third dipole arm 113, and a fourth dipole arm 114 along a circumferential direction. One end of the main portion 201 of a transmission structure of the feed network 20*a*, for example, a first transmission structure, is electrically connected to a radio frequency signal port, and the other end of the main portion 201 is divided into two branches. The two branches are a first branch 202 and a second branch 203 respectively. One end of the first branch 202 is directly electrically connected to the first dipole arm 111, to transmit a radio frequency signal with a phase of 0° to the first dipole arm 111, and one end of the second branch 203 is reversely coupled to the coupling member 204, so that a phase of an intersection line formed by the second branch 203 and the coupling member 204 is 180°.

For example, the second branch 203 includes two first stubs 203*a* that are parallel and disposed at an interval, and a first connecting portion 203*b* connected to first ends of the two first stubs 203*a*. An opening is provided between second ends of the two first stubs 203*a*. The coupling member 204 has two second stubs 204*a* that are parallel and disposed at an interval, and a second connecting portion 204*b* connected to first ends of the two second stubs 204*a*. An opening is provided between second ends of the two second stubs 204*a*.

Refer to FIG. 5. When the second branch 203 is reversely coupled to the coupling member 204, one second stub 204*a*, for example, a lower second stub 204*a*, extends from the opening of the second branch 203 to the two first stubs 203*a*, so that two sides of the lower second stub 204*a* are respectively reversely coupled to the two first stubs 203*a*; and another second stub 204*a*, for example, an upper second stub 204*a*, is located on an upper side of an upper first stub 203*a*, so that the upper second stub 204*a* is reversely coupled to the upper first stub 203*a*. A second end of the coupling member 204 is close to the first connecting portion 203*b* of the second branch 203, that is, the second connecting portion 204*b* of a first end of the coupling member 204 is far away from the first connecting portion 203*b*, and the second connecting portion 204*b* of the coupling member 204 is electrically connected to the third dipole arm 113.

The two second stubs 204*a* of the coupling member 204 and the two first stubs 203*a* of the second branch 203 form an intersection line, and the intersection line reverses a phase of the second branch 203, so that the second connecting portion 204*b* of the coupling member 204 finally transmits a radio frequency signal with a phase of 180° to the third dipole arm 113.

However, a coupling structure between the second branch 203 and the coupling member 204 is complex. As a result, a size of the coupling structure between the coupling member 204 and the second branch 203 is large, a size of the transmission structure of the feed network 20 is increased, and space occupied by the feed network 20 in the antenna apparatus is increased.

An embodiment of this disclosure provides a feed network 20, and a transmission structure 21 is redesigned. For example, the transmission structure 21 is disposed to include a main portion 211 and two branch portions 212, the main portion 211 is disposed with a first electric-conductor 211*a* and a second electric-conductor 211*b*, the first electric-conductor 211*a* and the second electric-conductor 211*b* respectively transmit equi-amplitude phase-inverted radio frequency signals, one end of one branch portion 212 is electrically connected to the first electric-conductor 211*a*, and one end of the other branch portion 212 is electrically connected to the second electric-conductor 211*b*. In this way, when two parts of a radiating element 10 are electrically connected to the two branch portions 212 respectively, the transmission structure 21 of the feed network 20 may feed equi-amplitude phase-inverted radio frequency signals into the two parts of the radiating element 10 via the two branch portions 212 respectively. Compared with the feed network 20 in the related technology, the feed network 20 in this embodiment of this disclosure has a simple line, so that a signal loss of the feed network 20 is reduced, and a size of the feed network 20 is also reduced, to reduce space occupied by the feed network 20 in the antenna apparatus, and provide proper space for disposing an array antenna.

The following describes in detail a specific structure of the feed network 20 in this embodiment of this disclosure with reference to the accompanying drawings.

Figure 6:
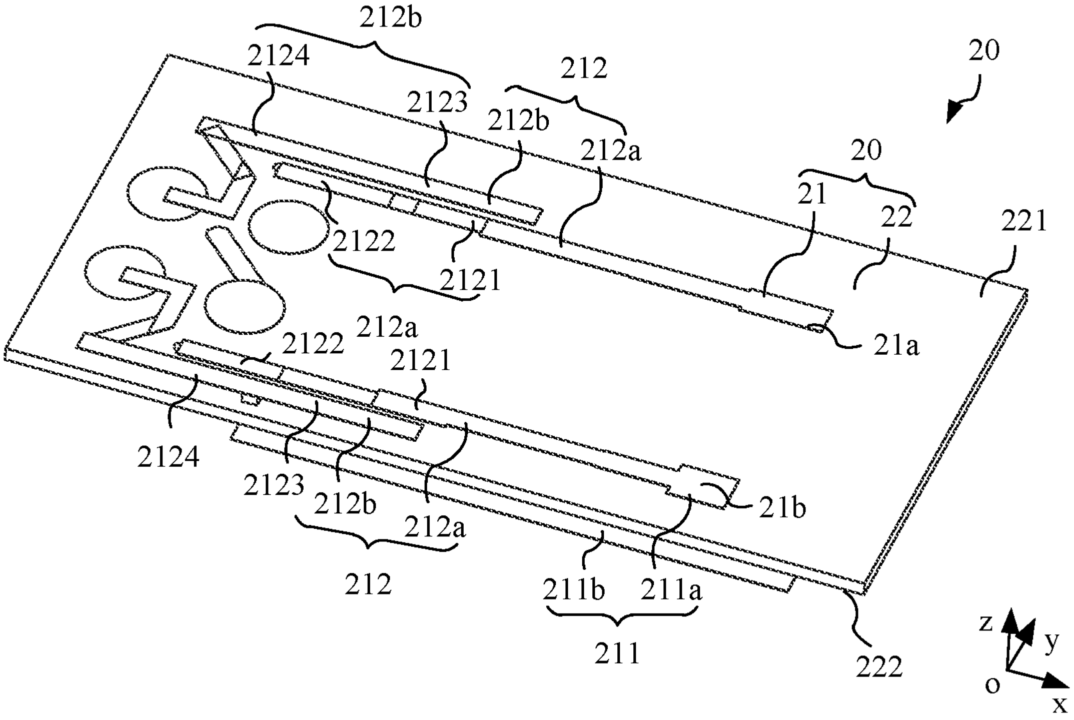
FIG. 6 is a diagram of a structure of the feed network in FIG. 2.

FIG. 6 is a diagram of a structure of the feed network in FIG. 2. Refer to FIG. 6. An embodiment of this disclosure provides a feed network 20. The feed network 20 includes a transmission structure 21. The transmission structure 21 includes a main portion 211 and two branch portions 212. The main portion 211 has a first electric-conductor 211*a* and a second electric-conductor 211*b* that are disposed opposite to each other, and there is a spacing between the first electric-conductor 211*a* and the second electric-conductor 211*b*. In other words, the first electric-conductor 211*a* and the second electric-conductor 211*b* may be separated by using an air medium or an insulation material medium, for example, a substrate 22 (which is to be mentioned below, as shown in FIG. 6), to implement coupled feeding between the first electric-conductor 211*a* and the second electric-conductor 211*b*.

In an actual application, the first electric-conductor 211*a* and the second electric-conductor 211*b* may be respectively configured to transmit equi-amplitude phase-inverted radio frequency signals. The following is described by using an example in which the first electric-conductor 211*a* is configured to transmit a radio frequency signal with a phase of 0° and the second electric-conductor 211*b* is configured to transmit a radio frequency signal with a phase of 180°.

It may be understood that both the first electric-conductor 211*a* and the second electric-conductor 211*b* are metal electric-conductors, for example, copper electric-conductors. Certainly, in another example, the metal electric-conductor may alternatively be another metal electric-conductor such as aluminum or silver.

The first electric-conductor 211*a* and the second electric-conductor 211*b* may be long-strip-shaped or sheet-shaped conducting layers. In this embodiment of this disclosure, an example in which the first electric-conductor 211*a* is a long-strip-shaped conducting layer and the second electric-conductor 211*b* is a sheet-shaped conducting layer is used.

It can be learned from the foregoing that one end of the transmission structure 21 of the feed network 20 is electrically connected to a radio frequency signal port in a radio frequency circuit. In this embodiment of this disclosure, one end of the first electric-conductor 211*a* of the main portion 211 is electrically connected to the radio frequency signal port in the radio frequency circuit. Because the second electric-conductor 211*b* is coupled to the first electric-conductor 211*a* for feeding, the second electric-conductor 211*b* is electrically connected to the radio frequency signal port by using the first electric-conductor 211*a*.

Refer to FIG. 2 and FIG. 6. In the two branch portions 212, one end of one branch portion 212 is electrically connected to the first electric-conductor 211*a*, and the other end of the branch portion 212 is electrically connected to the first radiation part, for example, the first dipole arm 111, of the radiating element 10, so that the first electric-conductor 211*a* is electrically connected to the first radiation part, for example, the first dipole arm 111, of the radiating element 10 by using the branch portion 212, to transmit a radio frequency signal with a phase of 0° to the first radiation part, for example, the first dipole arm 111, of the radiating element 10.

In the two branch portions 212, one end of the other branch portion 212 is electrically connected to the second electric-conductor 211*b*, and the other end of the other branch portion 212 is electrically connected to the second radiation part, for example, the third dipole arm 113, of the radiating element 10, so that the second electric-conductor 211*b* is electrically connected to the second radiation part of the radiating element 10 by using the other branch portion 212, to transmit a radio frequency signal with a phase of 180° to the second radiation part.

It may be understood that the first radiation part, for example, the first dipole arm 111, and the second radiation part, for example, the third dipole arm 113, of the radiating element 10 are two radiation parts in a same polarization direction. In an actual application, the two radiation parts, for example, the first dipole arm 111 and the third dipole arm 113, in the same polarization direction may be symmetrically disposed.

For ease of description, the two branch portions 212 may include a first branch portion 212*a* and a second branch portion 212*b*. One end of the first branch portion 212*a* is electrically connected to one end of the first electric-conductor 211*a*, and the other end of the first branch portion 212*a* is electrically connected to the first radiation part of the radiating element 10 in the antenna apparatus, so that the first electric-conductor 211*a* is electrically connected to the first radiation part by using the first branch portion 212*a*, to transmit the radio frequency signal with the phase of 0° to the first radiation part.

One end of the second branch portion 212*b* is electrically connected to the second electric-conductor 211*b*, and the other end of the second branch portion 212*b* is electrically connected to the second radiation part of the radiating element 10, so that the second electric-conductor 211*b* is electrically connected to the second radiation part by using the second branch portion 212*b*, to transmit the radio frequency signal with the phase of 180° to the second radiation part of the radiating element 10. In this way, the feed network 20 may respectively transmit equi-amplitude phase-inverted radio frequency signals to the two radiation parts of the radiating element 10 by using the transmission structure 21, to improve radiation performance of the radiating element 10.

For example, the antenna apparatus is a dipole antenna. One end of the first branch portion 212*a* is electrically connected to one end of the first electric-conductor 211*a*, and the other end of the first branch portion 212*a* may be electrically connected to the first dipole arm 111 of the radiating element 10, so that the first electric-conductor 211*a* is electrically connected to the first dipole arm 111 by using the first branch portion 212*a*, to transmit a radio frequency signal with a phase of 0° to the first dipole arm 111.

One end of the second branch portion 212*b* is electrically connected to the second electric-conductor 211*b*, and the other end of the second branch portion 212*b* is electrically connected to the third dipole arm 113 of the radiating element 10, so that the second electric-conductor 211*b* is electrically connected to the third dipole arm 113 by using the second branch portion 212*b*, to transmit a radio-frequency signal with a phase of 180° to the third dipole arm 113. In this way, the feed network 20 may respectively transmit equi-amplitude phase-inverted radio frequency signals to the first dipole arm 111 and the third dipole arm 113 of the radiating element 10 by using the transmission structure 21, to improve radiation performance of the radiating element 10.

Refer to FIG. 6. For example, the main portion 211 may include a microstrip. The first electric-conductor 211*a* is an inner conductor of the microstrip, and the second electric-conductor 211*b* is an outer conductor of the microstrip. The inner conductor and the outer conductor of the microstrip respectively transmit equi-amplitude phase-inverted radio frequency signals.

It may be understood that, the first branch portion 212*a* of the transmission structure 21 is electrically connected to the inner conductor of the microstrip, and the second branch portion 212*b* of the transmission structure 21 is electrically connected to the outer conductor of the microstrip. In this way, the first branch portion 212*a* and the second branch portion 212*b* of the transmission structure 21 may respectively transmit equi-amplitude phase-inverted radio frequency signals.

For example, when the inner conductor transmits a radio frequency signal with a phase of 0°, the first branch portion 212*a* transmits the radio frequency signal with the phase of 0° to the first radiation part of the radiating element 10. When the outer conductor transmits a radio frequency signal with a phase of 180°, the second branch portion 212*b* transmits the radio frequency signal with the phase of 180° to the second radiation part of the radiating element 10.

In this embodiment of this disclosure, the main portion 211 is set as a microstrip structure, and an equi-amplitude phase-inverted feature of the inner conductor and the outer conductor in the microstrip structure is properly used, so that one end of the first branch portion 212*a* and one end of the second branch portion 212*b* are electrically connected to the inner conductor and the outer conductor respectively. Therefore, when the other end of the first branch portion 212*a* and the other end of the second branch portion 212*b* are electrically connected to the radiating element 10, equi-amplitude phase-inverted radio frequency signals can be fed into two radiation parts of the radiating element 10. In addition, a structure of the main portion 211 is also simplified by setting the main portion 211 as the microstrip structure, to simplify a structure of a connection between the main portion 211 and the two branch portions 212, and improve manufacturing efficiency of the entire feed network 20.

When the main portion 211 is the microstrip, the microstrip may be an air microstrip, in other words, the inner conductor and the outer conductor of the microstrip are separated by using an air medium, that is, the inner conductor and the outer conductor are coupled for feeding by using the air medium. For example, coupled feeding is implemented between the first electric-conductor 211*a* and the second electric-conductor 211*b* of the main portion 211 by using the air medium.

Certainly, in another example, the main portion 211 may further include a strip line. It may be understood that the strip line includes a first electric-conductor 211*a* and second electric-conductors 211*b* located on two sides of the first electric-conductor 211*a*. In other words, there are two second electric-conductors 211*b*, the two second electric-conductors 211*b* are respectively located on the two sides of the first electric-conductor 211*a*, and the two second electric-conductors 211*b* are separated from the first electric-conductor 211*a* by using an intermediate dielectric layer, for example, the substrate 22. The first electric-conductor 211*a* and any second electric-conductor 211*b* respectively transmit equi-amplitude phase-inverted radio frequency signals.

During specific arrangement in this embodiment of this disclosure, one end of the second branch portion 212*b* may be electrically connected to any second electric-conductor 211*b*, or one end of the second branch portion 212*b* may be connected to both the two second electric-conductors 211*b*. This is not limited in this embodiment of this disclosure.

This embodiment of this disclosure is described by using the microstrip as the main portion 211.

It may be understood that, in the foregoing example, the transmission structure 21 is one transmission structure 21 of the feed network 20, for example, the first transmission structure 21*a*.

Different from the foregoing example, the transmission structure 21 in this embodiment of this disclosure may alternatively be the second transmission structure 21*b*. In other words, the second transmission structure 21*b* of the feed network 20 may be made by using the foregoing structure. For example, the other end of the first branch portion 212*a* of the second transmission structure 21*b* may be electrically connected to the second dipole arm 112 of the radiating element 10, to transmit a radio frequency signal with a phase of 0° to the second dipole arm 112. The other end of the second branch portion 212*b* may be electrically connected to the fourth dipole arm 114 of the radiating element 10, to transmit a radio frequency signal with a phase of 180° to the fourth dipole arm 114. In this way, the feed network 20 may respectively transmit equi-amplitude phase-inverted radio frequency signals to the second dipole arm 112 and the fourth dipole arm 114 of the radiating element 10 by using the transmission structure 21.

Certainly, in some examples, each transmission structure 21 of the feed network 20 may be made by using the structure in this embodiment of this disclosure. For example, the first transmission structure 21*a* and the second transmission structure 21*b* of the feed network 20 each include the main portion 211 and the two branch portions 212.

In the first transmission structure 21*a*, one end of the first electric-conductor 211*a* of the main portion 211 is electrically connected to the first radio frequency signal port, the other end of the first electric-conductor 211*a* is electrically connected to the first branch portion 212*a*, and the other end of the first branch portion 212*a* is electrically connected to the first dipole arm 111 of the radiating element 10, so that the first radio frequency signal port is electrically connected to the first dipole arm 111 by using the first electric-conductor 211*a* and the first branch portion 212*a* in sequence. In this way, a radio frequency signal in the first polarization direction may be fed into the first dipole arm 111, and a phase of the radio frequency signal is 0°.

In the first transmission structure 21*a*, the second electric-conductor 211*b* of the main portion 211 is electrically connected to one end of the second branch portion 212*b*, and the other end of the second branch portion 212*b* is electrically connected to the third dipole arm 113 of the radiating element 10. Because the second electric-conductor 211*b* of the main portion 211 is coupled to the first electric-conductor 211*a* for feeding, one end of the second electric-conductor 211*b* is electrically connected to the first radio frequency signal port. In this way, the first radio frequency signal port is electrically connected to the third dipole arm 113 by using the first electric-conductor 211*a*, the second electric-conductor 211*b*, and the second branch portion 212*b* in sequence, to feed a radio frequency signal in the first polarization direction into the third dipole arm 113, and a phase of the radio frequency signal is 180°.

It can be learned from the foregoing that, the two branch portions 212 of the first transmission structure 21*a* may respectively feed equi-amplitude phase-inverted first radio frequency signals into the first dipole arm 111 and the third dipole arm 113 of the radiating element 10, and the first radio frequency signals are radio frequency signals in the first polarization direction, for example, the +45° polarization direction.

In the second transmission structure 21*b*, one end of the first electric-conductor 211*a* of the main portion 211 is electrically connected to the second radio frequency signal port, the other end of the first electric-conductor 211*a* is electrically connected to the first branch portion 212*a*, and the other end of the first branch portion 212*a* is electrically connected to the second dipole arm 112 of the radiating element 10, so that the second radio frequency signal port is electrically connected to the second dipole arm 112 by using the first electric-conductor 211*a* and the first branch portion 212*a* in sequence. In this way, a second radio frequency signal in the second polarization direction may be fed into the second dipole arm 112, and a phase of the second radio frequency signal is 0°.

In the second transmission structure 21*b*, the second electric-conductor 211*b* of the main portion 211 is electrically connected to one end of the second branch portion 212*b*, and the other end of the second branch portion 212*b* is electrically connected to the fourth dipole arm 114 of the radiating element 10. Because the second electric-conductor 211*b* of the main portion 211 is coupled to the first electric-conductor 211*a* for feeding, one end of the second electric-conductor 211*b* is electrically connected to the second radio frequency signal port. In this way, the second radio frequency signal port is electrically connected to the fourth dipole arm 114 by using the first electric-conductor 211*a*, the second electric-conductor 211*b*, and the second branch portion 212*b* in sequence, to feed a radio frequency signal in the second polarization direction into the fourth dipole arm 114, and a phase of the radio frequency signal is 180°.

It can be learned from the foregoing that, the two branch portions 212 of the second transmission structure 21*b* may respectively feed equi-amplitude phase-inverted radio frequency signals into the second dipole arm 112 and the fourth dipole arm 114 of the radiating element 10, and the radio frequency signals are radio frequency signals in the second polarization direction, for example, the −45° polarization direction.

In this embodiment of this disclosure, the two transmission structures 21 are disposed in the feed network 20. One transmission structure 21 may transmit radio frequency signals in one polarization direction to one pair of symmetric parts of the radiating element 10, and the other transmission structure 21 may transmit radio frequency signals in another polarization direction to the other pair of symmetric parts of the radiating element 10, to implement a dual-polarized feeding function of the feed network 20. In addition, each transmission structure 21 is set as the foregoing structure, to ensure that each transmission structure 21 can transmit equi-amplitude phase-inverted radio frequency signals to two parts of the radiating element 10, thereby ensuring radiation performance of the radiating element 10.

In this embodiment of this disclosure, the main portion 211 is disposed with the first electric-conductor 211*a* and the second electric-conductor 211*b*, and the first electric-conductor 211*a* and the second electric-conductor 211*b* respectively transmit equi-amplitude phase-inverted radio frequency signals. In addition, the two branch portions 212 are disposed, one end of the first branch portion 212*a* is electrically connected to the first electric-conductor 211*a*, and one end of the second branch portion 212*b* is electrically connected to the second electric-conductor 211*b*. In this way, when the two parts of the radiating element 10 are electrically connected to the first branch portion 212*a* and the second branch portion 212*b* respectively, the transmission structure 21 of the feed network 20 may feed equi-amplitude phase-inverted radio frequency signals to the two radiation parts of the radiating element 10 via the first branch portion 212*a* and the second branch portion 212*b* respectively. In one aspect, settings of the feed network 20 ensure radiation performance of the radiating element 10. In another aspect, compared with the feed network 20 in the related technology, the feed network 20 in this embodiment of this disclosure has a simple line, so that a signal loss of the feed network 20 is reduced, and a size of the feed network 20 is also reduced, to reduce space occupied by the feed network 20 in the antenna apparatus, and provide proper space for disposing an array antenna. In addition, the feed network 20 in this embodiment of this disclosure is also easy to be manufactured, thereby improving manufacturing efficiency of the feed network 20.

Refer to FIG. 6. In this embodiment of this disclosure, the main portion 211 forming the microstrip may alternatively be a dielectric substrate microstrip. In other words, the inner conductor and the outer conductor are separated by using a dielectric substrate such as the substrate 22 (as shown in FIG. 6), that is, the inner conductor and the outer conductor are coupled for feeding by using the substrate 22.

Refer to FIG. 6. For example, the feed network 20 further includes the substrate 22. The substrate 22 includes a first surface 221 and a second surface 222 that are disposed opposite to each other. The first electric-conductor 211*a* is located on the first surface 221, and the second electric-conductor 211*b* is located on the second surface 222. In this way, the first electric-conductor 211*a*, the substrate 22, and the second electric-conductor 211*b* jointly form the microstrip. The substrate 22 is used as a dielectric substrate of the microstrip.

For ease of description, in this embodiment of this disclosure, a length direction of the feed network 20 is an x direction, a width direction of the feed network 20 is a y direction, and a height direction of the feed network 20 is a z direction. It may be understood that a length direction of the substrate 22 is consistent with the x direction, a width direction is consistent with the y direction, and a height direction is consistent with the z direction.

It should be noted that the substrate 22 may be a printed circuit board (PCB for short), and the first electric-conductor 211*a* and the second electric-conductor 211*b* may be printed on the first surface 221 and the second surface 222 of the substrate 22. In addition, at least a part of the first branch portion 212*a* and at least a part of the second branch portion 212*b* may be located on the first surface 221.

The substrate 22 is used as the dielectric substrate, that is, an intermediate dielectric layer, of the microstrip structure, so that the first electric-conductor 211*a* and the second electric-conductor 211*b* are stably disposed on surfaces of two sides of the substrate 22, to improve structural stability of the main portion 211.

In addition, at least the part of the first branch portion 212*a* and at least the part of the second branch portion 212*b* are also disposed on the first surface 221, so that both the first electric-conductor 211*a* of the microstrip and at least the parts of the two branch portions 212 may be manufactured, for example, printed on the first surface 221 of the substrate 22, to simplify a manufacturing process of the transmission structure 21.

In some examples, both the first branch portion 212*a* and the second branch portion 212*b* are located on the first surface 221. In this way, both the first electric-conductor 211*a* of the microstrip and the two branch portions 212 may be manufactured, for example, printed on the first surface 221 of the substrate 22, to simplify a manufacturing process of the transmission structure 21.

Figure 9:
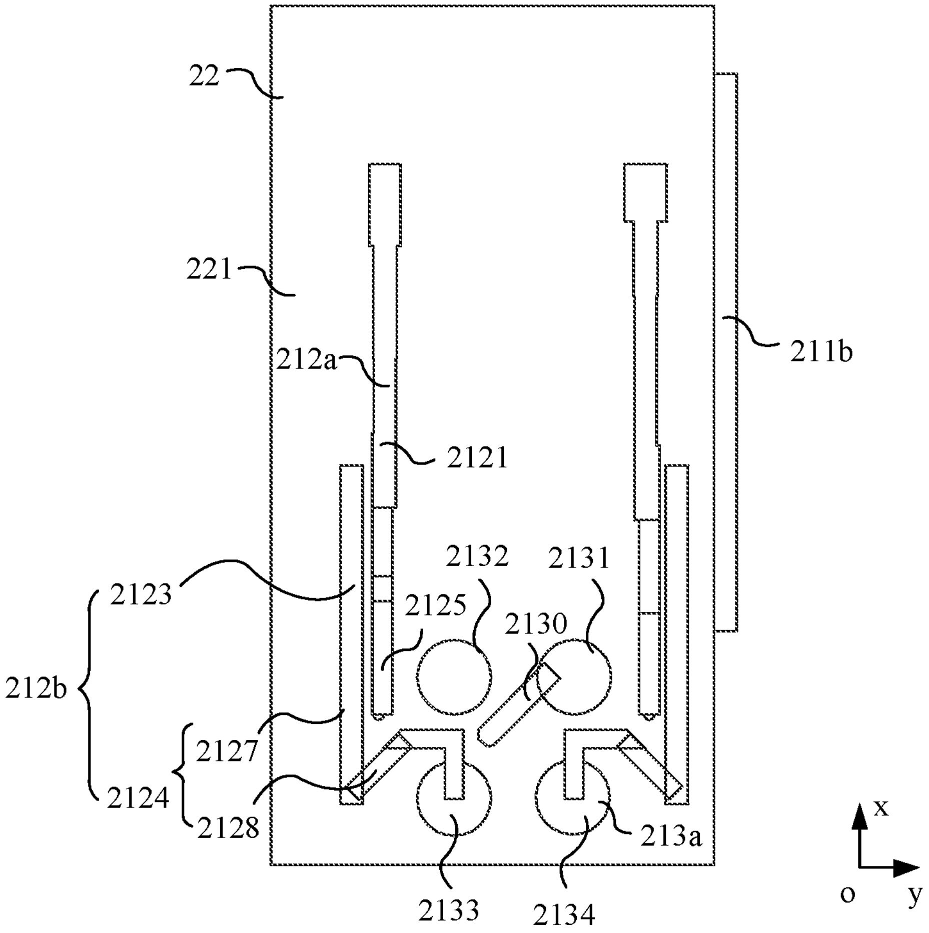
FIG. 9 is a diagram of a structure of a first surface of the substrate in FIG. 6.
Figure 10:
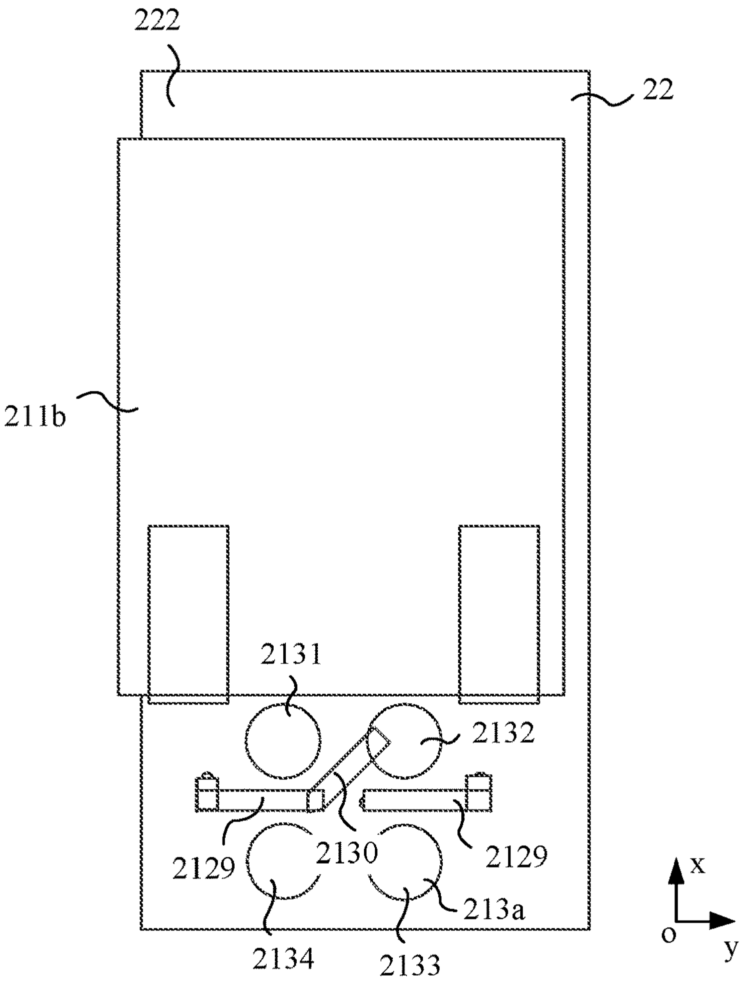
FIG. 10 is a diagram of a structure of a second surface of the substrate in FIG. 6.

Certainly, in some other examples, a part of the first branch portion 212*a* and a part of the second branch portion 212*b* are located on the first surface 221, and the other part of the first branch portion 212*a* and the other part of the second branch portion 212*b* are located on the second surface 222, to properly use space of the two surfaces of the substrate 22, and avoid a case in which the first branch portion 212*a* and the second branch portion 212*b* are concentrated on one surface and interfere with another component or circuit wiring on the surface (for details, refer to the following content, and refer to FIG. 9 and FIG. 10).

In addition, the first branch portion 212*a* and the second branch portion 212*b* are disposed on the substrate 22, to improve structural stability of the branch portion 212.

Figure 7:
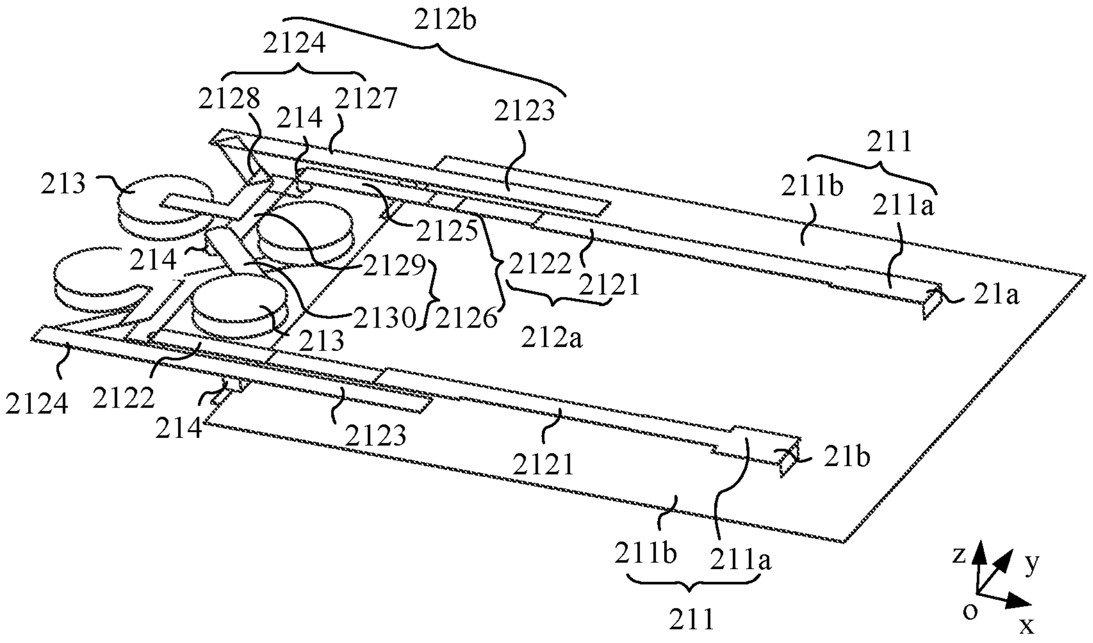
FIG. 7 is a diagram of a structure of the transmission structure in FIG. 6 from one perspective.

FIG. 7 is a diagram of a structure of the transmission structure in FIG. 6 from one perspective. Refer to FIG. 7. In some examples, the first branch portion 212*a* may include a first part 2121 and a second part 2122. The first part 2121 and the second part 2122 are sequentially disposed along an extension direction of the first branch portion 212*a*. For example, one end of the first part 2121 is electrically connected to the first electric-conductor 211*a*, the other end of the first part 2121 is electrically connected to the second part 2122, and the other end of the second part 2122 is electrically connected to the first radiation part, for example, the first dipole arm 111 (refer to FIG. 2), of the radiating element 10.

Refer to FIG. 6 and FIG. 7. A projection region of the first part 2121 on the second surface 222 is located inside the second electric-conductor 211*b*. In other words, a projection of the first part 2121 and a projection of the second electric-conductor 211*b* overlap in a direction perpendicular to the substrate 22. For example, the first part 2121 may be separated from the second electric-conductor 211*b* by using the substrate 22, so that the first part 2121, the second electric-conductor 211*b*, and the substrate 22 jointly form a partial microstrip structure, to improve an impedance match effect of the first branch portion 212*a*.

It may be understood that, that a projection of the first part 2121 and a projection of the second electric-conductor 211*b* overlap in a direction perpendicular to the substrate 22 means that the projection of the entire first part 2121 and the projection of the second electric-conductor 211*b* overlap in the direction perpendicular to the substrate 22. Certainly, in this embodiment of this disclosure, an example in which a projection of a part of the first part 2121 and the projection of the second electric-conductor 211*b* may overlap in the direction perpendicular to the substrate 22 is not excluded.

In addition, a projection region of the first part 2121 on the second surface 222 is located outside the second electric-conductor 211*b*. In other words, a projection of the second part 2122 and a projection of the second electric-conductor 211*b* are staggered in the direction perpendicular to the substrate 22, so that the second part 2122 is used as a conducting wire part of the first branch portion 212*a*.

Similarly, refer to FIG. 6 and FIG. 7. In some examples, the second branch portion 212*b* may also include a third part 2123 and a fourth part 2124, and the third part 2123 and the fourth part 2124 are sequentially disposed along an extension direction of the second branch portion 212*b*. For example, the third part 2123 is electrically connected to the second electric-conductor 211*b*, one end of the fourth part 2124 is electrically connected to the third part 2123, and the other end of the fourth part 2124 is electrically connected to the second radiation part of the radiating element 10.

A projection region of the third part 2123 on the second surface 222 is located inside the second electric-conductor 211*b* (refer to FIG. 6). In other words, a projection of the third part 2123 and a projection of the second electric-conductor 211*b* overlap in the direction perpendicular to the substrate 22. For example, the third part 2123 may be separated from the second electric-conductor 211*b* by using the substrate 22, so that the third part 2123 of the second branch portion 212*b*, the second electric-conductor 211*b*, and the substrate 22 form a microstrip structure, to improve an impedance match effect of the second branch portion 212*b*.

It may be understood that, that a projection of the third part 2123 and a projection of the second electric-conductor 211*b* overlap in the direction perpendicular to the substrate 22 means that the projection of the entire third part 2123 and the projection of the second electric-conductor 211*b* overlap in the direction perpendicular to the substrate 22. Certainly, in this embodiment of this disclosure, an example in which a projection of a part of the third part 2123 and the projection of the second electric-conductor 211*b* may overlap in the direction perpendicular to the substrate 22 is not excluded.

In addition, as shown in FIG. 6, a projection of the fourth part 2124 and the projection of the second electric-conductor 211*b* are staggered in the direction perpendicular to the substrate 22 (refer to the z direction in FIG. 6). In other words, a projection region of the fourth part 2124 on the first surface 221 is located outside a projection region of the second electric-conductor 211*b* on the first surface 221, so that the fourth part 2124 is used as a conducting wire part of the second branch portion 212*b*.

Refer to FIG. 6. In this embodiment of this disclosure, at least a part of the first branch portion 212*a* and at least a part of the second branch portion 212*b* are disposed in parallel. For example, the first part 2121 of the first branch portion 212*a* and the third part 2123 of the second branch portion 212*b* are disposed in parallel. In this way, a coupling amount between the first part 2121 and the third part 2123 can be ensured, that is, a coupling amount between the first branch portion 212*a* and the second branch portion 212*b* is ensured, so that the radio frequency signals on the first branch portion 212*a* and the second branch portion 212*b* are wrapped with each other, to ensure that the signals on the first branch portion 212*a* and the second branch portion 212*b* achieve an equi-amplitude effect.

Refer to FIG. 6. Both the first part 2121 and the second part 2122 may extend in a length direction parallel to the substrate 22, so that the first part 2121 and the second part 2122 are disposed opposite to each other in a width direction parallel to the substrate 22, and the first part 2121 and the second part 2122 are coupled by using an air gap.

Certainly, in some examples, to increase the coupling amount between the first branch portion 212*a* and the second branch portion 212*b*, a part of the second part 2122 of the first branch portion 212*a* and a part of the fourth part 2124 of the second branch portion 212*b* may alternatively be disposed in parallel.

Refer to FIG. 7. The transmission structure 21 in this embodiment of this disclosure may further include two electrical connectors 213. The two electrical connectors 213 and the two branch portions 212 are correspondingly disposed, each electrical connector 213 is electrically connected to an end that is of a corresponding branch portion 212 and that is away from the main portion 211, and a corresponding part in the radiating element 10 is electrically connected to a corresponding electrical connector 213. In other words, each branch portion 212 is electrically connected to a corresponding part of the radiating element 10 by using a corresponding electrical connector 213.

For example, one end of the first branch portion 212*a* of the transmission structure 21 is electrically connected to one electrical connector 213, so that the first branch portion 212*a* is electrically connected to the first radiation part, for example, the first dipole arm 111, of the radiating element 10 by using the electrical connector 213. In this way, a radio frequency signal with a phase of 0° may be transmitted to the first dipole arm 111 by using the first branch portion 212*a* and the corresponding electrical connector 213.

One end of the second branch portion 212*b* of the transmission structure 21 is electrically connected to another electrical connector 213, so that the second branch portion 212*b* is electrically connected to the second radiation part, for example, the third dipole arm 113, of the radiating element 10 by using the electrical connector 213. In this way, a radio frequency signal with a phase of 180° may be transmitted to the third dipole arm 113 by using the second branch portion 212*b* and the corresponding electrical connector 213.

A size of each electrical connector 213 in an extension direction perpendicular to the branch portion 212 is greater than a width of the branch portion 212.

It should be noted that an extension direction of each branch portion 212 may be an extension direction parallel to the substrate 22. For example, an extension direction of each branch portion 212 is the x direction, and a width of each branch portion 212 is a distance between two sides of the branch portion 212 that are disposed opposite to each other and that are perpendicular to the extension direction (refer to the y direction in FIG. 7).

For example, a shape of the electrical connector 213 may be a cylindrical shape, and a diameter of the cylindrical shape may be greater than the width of the branch portion 212. In this way, an area of an electrical connection between the transmission structure 21 and the radiating element 10 can be increased, to ensure reliability of the electrical connection between the transmission structure 21 of the feed network 20 and the radiating element 10.

Figure 8:
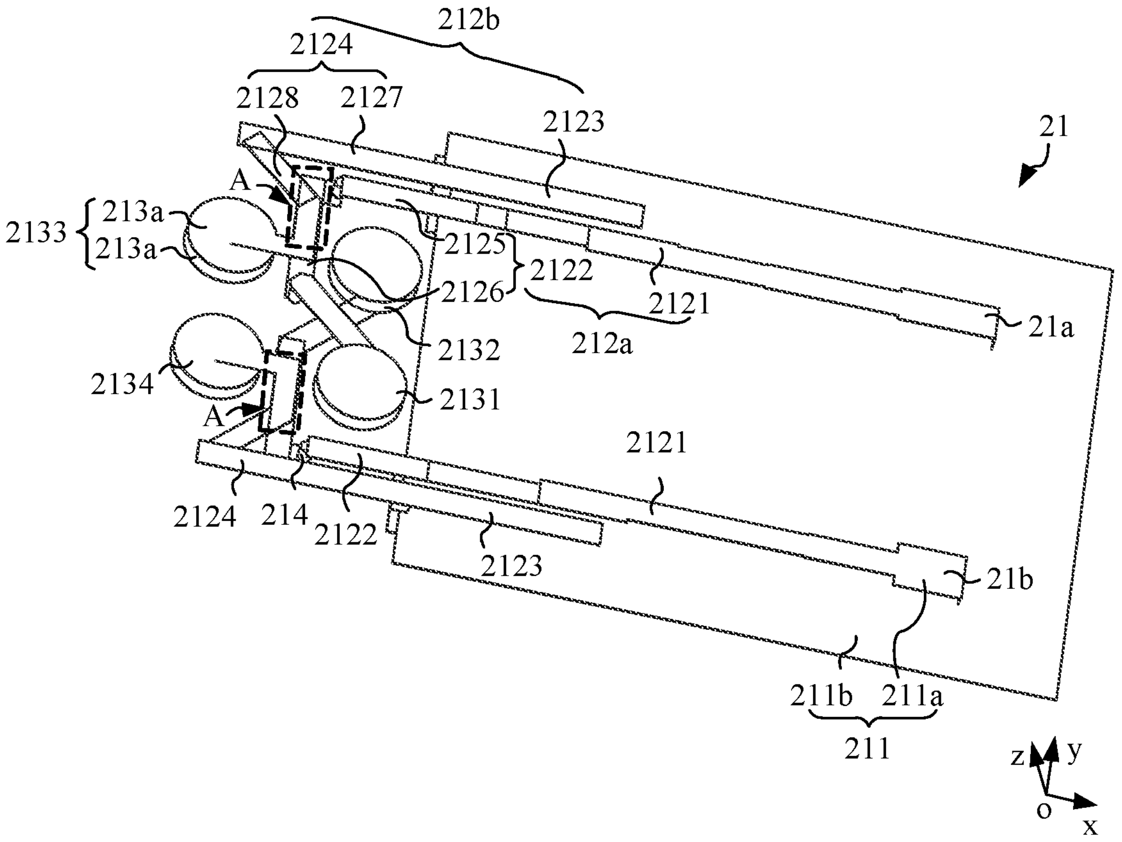
FIG. 8 is a diagram of a structure of the transmission structure in FIG. 6 from another perspective.

FIG. 8 is a diagram of a structure of the transmission structure in FIG. 6 from another perspective. Refer to FIG. 8. For ease of description, in this embodiment of this disclosure, two electrical connectors 213 of the first transmission structure 21*a* are respectively a first electrical connector 2131 and a third electrical connector 2133. The first electrical connector 2131 is electrically connected to the first branch portion 212*a* of the first transmission structure 21*a*, and the third electrical connector 2133 is electrically connected to the second branch portion 212*b* of the first transmission structure 21*a*, so that the first transmission structure 21*a* may transmit equi-amplitude phase-inverted radio frequency signals to a pair of symmetric parts of the radiating element 10 by using the first electrical connector 2131 and the third electrical connector 2133.

Refer to FIG. 2. For example, one end of the first electrical connector 2131 of the first transmission structure 21*a* is electrically connected to the first branch portion 212*a*, the other end of the first electrical connector 2131 may be electrically connected to the first dipole arm 111 of the radiating element 10, one end of the third electrical connector 2133 is electrically connected to the second branch portion 212*b*, and the other end of the third electrical connector 2133 may be electrically connected to the third dipole arm 113 of the radiating element 10. Therefore, the first transmission structure 21*a* transmits equi-amplitude phase-inverted radio frequency signals to the first dipole arm 111 and the third dipole arm 113 respectively, and a polarization direction of the radio frequency signals may be the first polarization direction, for example, the +45° polarization direction.

Correspondingly, two electrical connectors 213 of the second transmission structure 21*b* are respectively a second electrical connector 2132 and a fourth electrical connector 2134, the second electrical connector 2132 is electrically connected to the first branch portion 212*a* of the second transmission structure 21*b*, and the fourth electrical connector 2134 is electrically connected to the second branch portion 212*b* of the second transmission structure 21*b*, so that the second transmission structure 21*b* may transmit equi-amplitude phase-inverted radio frequency signals to the other pair of symmetric parts of the radiating element 10 by using the second electrical connector 2132 and the fourth electrical connector 2134.

For example, one end of the second electrical connector 2132 of the second transmission structure 21*b* is electrically connected to the first branch portion 212*a* of the second transmission structure 21*b*, the second electrical connector 2132 may be electrically connected to the second dipole arm 112 of the radiating element 10, one end of the fourth electrical connector 2134 is electrically connected to the second branch portion 212*b* of the second transmission structure 21*b*, and the fourth electrical connector 2134 may be electrically connected to the fourth dipole arm 114 of the radiating element 10. Therefore, the second transmission structure 21*b* transmits equi-amplitude phase-inverted radio frequency signals to the second dipole arm 112 and the fourth dipole arm 114 respectively, and a polarization direction of the radio frequency signals may be the second polarization direction, for example, the −45° polarization direction.

The first electrical connector 2131, the second electrical connector 2132, the third electrical connector 2133, and the fourth electrical connector 2134 are sequentially arranged in a ring shape, to ensure that each electrical connector 213 corresponds to a corresponding part of the radiating element 10 in the direction perpendicular to the substrate 22, and simplify an electrical connection path between the radiating element 10 and each electrical connector 213.

For example, the first dipole arm 111 and the first electrical connector 2131 have an overlapping region in the z direction, the third dipole arm 113 and the third electrical connector 2133 have an overlapping region in the z direction, the second dipole arm 112 and the second electrical connector 2132 have an overlapping region in the z direction, and the fourth dipole arm 114 and the fourth electrical connector 2134 have an overlapping region in the z direction. In this way, the dipole arm may be electrically connected to the corresponding electrical connector 213 by using a vertical feeding member 12 perpendicular to the substrate 22, and a structure such as a bent portion does not need to be disposed on the feeding member 12, to simplify a connection line between the radiating element 10 and each electrical connector 213, and improve manufacturing efficiency of the antenna apparatus.

Refer to FIG. 2. In an actual application, the radiating element 10 may be directly electrically connected to the transmission structure 21. In this way, the radiating element 10 is electrically connected to the transmission structure 21 by using the electrical connector 213, to increase a contact area between the radiating element 10 and the transmission structure 21, and enhance stability of the connection and reliability of the electrical connection between the radiating element 10 and the transmission structure 21.

Certainly, the radiating element 10 and the transmission structure 21 may alternatively be coupled for feeding. In other words, one end of the radiating element 10 and the transmission structure 21 are disposed opposite to each other and at an interval. In this way, the radiating element 10 is electrically connected to the transmission structure 21 by using the electrical connector 213, to increase a coupling area between the radiating element 10 and the transmission structure 21, increase a coupling amount between the radiating element 10 and the transmission structure 21, and improve reliability of the electrical connection between the radiating element 10 and the transmission structure 21.

FIG. 9 is a diagram of a structure of a first surface of the substrate in FIG. 6. FIG. 10 is a diagram of a structure of a second surface of the substrate in FIG. 6. Refer to FIG. 8 to FIG. 10. During specific arrangement, each electrical connector 213 may include two electrical sub-connectors 213*a* (refer to FIG. 8) disposed opposite to each other in the direction perpendicular to the substrate 22. One electrical sub-connector 213*a* is disposed on the first surface 221 of the substrate 22, the other electrical sub-connector 213*a* is disposed on the second surface 222 of the substrate 22, and the two electrical sub-connectors 213*a* are electrically connected. For example, the two electrical sub-connectors 213*a* may be electrically connected through a metal via hole formed in the substrate 22.

When the radiating element 10 is electrically connected to the transmission structure 21, the radiating element 10 may be electrically connected to any electrical sub-connector 213*a* in the corresponding electrical connectors 213, to improve manner flexibility of the connection between the radiating element 10 and the electrical connector 213. For example, the radiating element 10 may be connected to the electrical sub-connector 213*a* on the first surface 221, or may pass through the electrical connector 213, and be connected to the electrical sub-connector 213*a* on the second surface 222.

For example, when the first dipole arm 111 of the radiating element 10 is electrically connected to the first branch portion 212*a* of the first transmission structure 21*a*, the first dipole arm 111 may be electrically connected to the electrical connector 213 that is on the first branch portion 212*a* and that is located on the first surface 221, so that a radio frequency signal with a phase of 0° may be transmitted to the first dipole arm 111 by using the first branch portion 212*a* and the electrical sub-connector 213*a*. Certainly, the first dipole arm 111 may be electrically connected to the electrical connector 213 that is on the first branch portion 212*a* and that is located on the second surface 222, so that a radio frequency signal with a phase of 0° may be transmitted to the first dipole arm 111 by using the first branch portion 212*a* and the electrical sub-connector 213*a*.

Refer to FIG. 2. The radiating element 10 usually includes the radiator 11 and the feeding member 12. One end of the feeding member 12 is electrically connected to the radiator 11, for example, the dipole arm, and the other end of the feeding member 12 is electrically connected to the transmission structure 21 of the feed network 20, so that the radiator 11, for example, the dipole arm, is electrically connected to the feed network 20 via the feeding member 12.

The radiator 11 is electrically connected to the electrical connector 213 of the transmission structure 21 via the feeding member 12, to improve reliability of the electrical connection between the radiating element 10 and the feed network 20.

In some examples, when the radiating element 10 is connected to the transmission structure 21 of the feed network 20, one end that is of the feeding member 12 and that is away from the radiator 11 may be electrically connected to one electrical sub-connector 213*a* of the corresponding electrical connectors 213, or may be electrically connected to the other electrical sub-connector 213*a*. For example, with reference to FIG. 2, when the radiator 11 of the radiating element 10 is located on the first surface 221 of the substrate 22, one end that is of the feeding member 12 and that is away from the radiator 11 may be directly electrically connected to the electrical sub-connector 213*a* on the first surface 221, so that the radiator 11 is electrically connected to the transmission structure 21 of the feed network 20 via the feeding member 12.

For example, when the four dipole arms of the radiating element 10 are located on the first surface 221 of the substrate 22, one end of the feeding member 12 is electrically connected to the first dipole arm 111, and the other end of the feeding member 12 may be electrically connected to the electrical sub-connector 213*a* that is on the first branch portion 212*a* and that is located on the first surface 221, so that the feeding member 12 is electrically connected to the first branch portion 212*a* by using the electrical sub-connector 213*a* on the first surface 221.

Certainly, when the radiator 11 of the radiating element 10 is located on the first surface 221 of the substrate 22, one end that is of the feeding member 12 and that is away from the radiator 11 may be threaded into the electrical connector 213, and is electrically connected to the electrical sub-connector 213*a* on the second surface 222, so that the radiator 11 is electrically connected to the transmission structure 21 of the feed network 20 via the feeding member 12. For example, one end of the feeding member 12 is electrically connected to the first dipole arm 111, and the other end of the feeding member 12 may pass through the electrical sub-connector 213*a* on the first surface 221 and the substrate 22, and is electrically connected to the electrical sub-connector 213*a* on the second surface 222, so that the feeding member 12 is electrically connected to the first branch portion 212*a* by using the electrical sub-connector 213*a* on the second surface 222.

When the radiator 11 of the radiating element 10 is located on the first surface 221 of the substrate 22, one end of the feeding member 12 of the radiating element 10 may pass through the electrical connector 213, and be welded to the electrical sub-connector 213*a* on the second surface 222. The first dipole arm 111 of the radiating element 10 is used as an example. One end of the feeding member 12 is electrically connected to the first dipole arm 111, and the other end of the feeding member 12 may pass through the electrical sub-connector 213*a* on the first surface 221, the substrate 22, and the electrical sub-connector 213*a* on the second surface 222, and be welded to the electrical sub-connector 213*a* on the second surface 222.

In this embodiment of this disclosure, the electrical connector 213 is set as the electrical sub-connectors 213*a* that are respectively located on the two surfaces of the substrate 22. In this way, the feeding member 12 of the radiating element 10 may pass through the electrical connector 213, and be welded to the electrical sub-connector 213*a* that is away from the radiator 11 and that is on the substrate 22. In one aspect, stability of the connection between the radiating element 10 and the electrical connector 213 is improved, to ensure reliability of the electrical connection between the radiating element 10 and the transmission structure 21. In another aspect, one end of the feeding member 12 is welded to the electrical sub-connector 213*a* that is away from the radiator 11 and that is on the substrate 22, to avoid spatial interference caused by the radiator 11 to a welding process and avoid affecting welding efficiency.

Refer to FIG. 6, FIG. 9, and FIG. 10. At least a part of the first branch portion 212*a* and at least a part of the second branch portion 212*b* are respectively located on different sides of the substrate 22 of the feed network 20, to properly use space on the two sides of the substrate 22, and avoid a case in which the first branch portion 212*a* and the second branch portion 212*b* are centralized on one side, for example, the first surface 221, and occupy space for disposing another part of the feed network 20, for example, the electrical connector 213.

For example, with reference to FIG. 9, the second branch portion 212*b* is located on the first surface 221 of the substrate 22, so that both the second branch portion 212*b* and the first electric-conductor 211*a* are disposed on the first surface 221 of the substrate 22. In this way, a process of disposing the second branch portion 212*b* on the substrate 22 can be simplified, and the second branch portion 212*b* and the first electric-conductor 211*a* may be printed on the first surface 221 of the substrate 22. At least a part of the second part 2122 of the first branch portion 212*a* is located on the second surface 222 of the substrate 22, to save partial space of the first surface 221, and provide proper disposing space for the electrical connector 213, for example, the electrical sub-connector 213*a* on the first surface 221.

Refer to FIG. 7. The third part 2123 of the second branch portion 212*b* may be electrically connected to the second electric-conductor 211*b* on the other side of the substrate 22 through the metal via hole 214 formed in the substrate 22. It may be understood that the metal via hole 214 may be provided at an end that is of the third part 2123 and that faces the fourth part 2124. In other words, the metal via hole 214 is provided at a joint between the third part 2123 and the fourth part 2124.

It may be understood that a shape of the metal via hole 214 in this embodiment of this disclosure may include but is not limited to a cylindrical shape, a cube shape, and the like.

In addition, with reference to FIG. 9, the first part 2121 and a part (for example, a first extension portion 2125) of the second part 2122 of the first branch portion 212*a* may be located on the first surface 221 of the substrate 22. In this way, the first part 2121 and the part of the second part 2122 of the first branch portion 212*a* and the first electric-conductor 211*a* may also be printed on the first surface 221. The other part of the second part 2122 is located on the second surface 222. In this way, the part and the second electric-conductor 211*b* may be printed on the second surface 222 of the substrate 22.

Refer to FIG. 8. The second part 2122 of the first branch portion 212*a* includes the first extension portion 2125 and a first bent portion 2126. It may be understood that the first extension portion 2125 and the first bent portion 2126 are sequentially disposed along an extending direction of the second part 2122. For example, one end of the first extension portion 2125 is electrically connected to the first part 2121, the other end of the first extension portion 2125 is electrically connected to one end of the first bent portion 2126, and the other end of the first bent portion 2126 is electrically connected to the first radiation part, for example, the first dipole arm 111, of the radiating element 10.

In this embodiment of this disclosure, a part of the first branch portion 212*a* is set as a bent portion, and compared with that the second part 2122 is set as two straight-line structures respectively connected to the first part 2121 and the corresponding electrical connector 213, an extension length of the first branch portion 212*a* is extended.

Because the first branch portion 212*a* is electrically connected to the radiating element 10, in an actual application, the first branch portion 212*a* may be considered as an extension part of the radiating element 10. A length of the first branch portion 212*a* is extended to increase an area of the radiating element 10, so that a radiation bandwidth of the radiating element 10 may be increased. For example, a low frequency of the radiating element 10 may be moved to a low frequency.

Refer to FIG. 8. At least a part of the first bent portion 2126 and at least a part of the second branch portion 212*b* are located between the third electrical connector 2133 and the second electrical connector 2132 of the feed network 20. For example, at least a part of the first bent portion 2126 and a part of the fourth part 2124 may be located between the third electrical connector 2133 and the second electrical connector 2132.

Refer to FIG. 7. The first bent portion 2126 includes a fifth part 2129 and a sixth part 2130 that are sequentially disposed along an extension direction. One end of the fifth part 2129 is electrically connected to the first extension portion 2125, the other end of the fifth part 2129 is electrically connected to the sixth part 2130, and the other end of the sixth part 2130 is electrically connected to a corresponding electrical connector 213.

In some examples, at least a part (for example, the fifth part 2129) of the first bent portion 2126 is located on the second surface 222 (refer to FIG. 10), and the second branch portion 212*b* is located on the first surface 221 (refer to FIG. 9). In this way, it can be ensured that the part of the first bent portion 2126 and the part of the second branch portion 212*b* may be centralized between the third electrical connector 2133 and the second electrical connector 2132, to provide proper disposing space for disposing another component on the substrate 22.

It may be understood that both the first extension portion 2125 of the first branch portion 212*a* and the first part 2121 may be located on the first surface 221 of the substrate 22.

Refer to FIG. 10. In some examples, the first bent portion 2126 may be entirely located on the second surface 222. In other words, both the fifth part 2129 and the sixth part 2130 are located on the second surface 222. In this way, one end of the first bent portion 2126 may be electrically connected to the first extension portion 2125 through the metal via hole 214 (refer to FIG. 7), and the other end of the first bent portion 2126 may be directly electrically connected to the electrical connector 213 on the second surface 222.

In another example, a part of the first bent portion 2126, for example, the fifth part 2129, may be located on the second surface 222, and the other part, for example, the sixth part 2130, may be located on the first surface 221. The fifth part 2129 may be located between the third electrical connector 2133 and the second electrical connector 2132 (refer to FIG. 7), to ensure that both the fifth part 2129 and the part of the first bent portion 2126 are centralized between the third electrical connector 2133 and the second electrical connector 2132, and save space at another position on the substrate 22.

Refer to FIG. 7 and FIG. 8. In this example, one end of the fifth part 2129 may be electrically connected to the first extension portion 2125 through the metal via hole 214, the other end of the fifth part 2129 may be electrically connected to the sixth part 2130 through the metal via hole 214, and the other end of the sixth part 2130 may be directly electrically connected to the corresponding electrical sub-connector 213*a* on the first surface 221.

Refer to FIG. 8. In some examples, the fourth part 2124 of the second branch portion 212*b* may include a second extension portion 2127 and a second bent portion 2128. It may be understood that the second extension portion 2127 and the second bent portion 2128 are sequentially disposed along an extending direction of the fourth part 2124. For example, a first end of the second extension portion 2127 is connected to the third part 2123 of the second branch portion 212*b*, a second end of the second extension portion 2127 is connected to the second bent portion 2128, and the other end of the second bent portion 2128 is electrically connected to the second radiation part of the radiating element 10.

In this embodiment of this disclosure, a part of the second branch portion 212*b*, for example, the fourth part 2124, is set as a bent portion, and compared with that the fourth part 2124 is set as two straight-line structures respectively connected to the third part 2123 and the corresponding electrical connector 213, an extension length of the second branch portion 212*b* is extended.

Because the second branch portion 212*b* is electrically connected to the radiating element 10, in an actual application, the second branch portion 212*b* may be considered as an extension part of the radiating element 10. A length of the second branch portion 212*b* is extended to increase an area of the radiating element 10, so that a radiation bandwidth of the radiating element 10 may be increased. For example, a low frequency of the radiating element 10 may be moved to a low frequency.

Refer to FIG. 8. The second bent portion 2128 and the first bent portion 2126 have an overlapping region (as shown in A in FIG. 8) in the direction perpendicular to the substrate 22, and the overlapping region A is located between the second electrical connector 2132 and the third electrical connector 2133 of the feed network 20.

It may be understood that the foregoing example is described by using the first transmission structure 21*a* as an example.

When the transmission structure 21 is the second transmission structure 21*b*, the overlapping region A is located between the first electrical connector 2131 and the fourth electrical connector 2134 of the feed network 20, to ensure that the second bent portion 2128 is between adjacent electrical sub-connectors 213*a* on the first surface 221, and also ensure that the first bent portion 2126 is between adjacent electrical sub-connectors 213*a* on the second surface 222. In this way, the second bent portion 2128 and the first bent portion 2126 are both centralized between two adjacent electrical connectors 213, to save other space on the substrate 22, and facilitate layout of another component or a line.

Figure 11:
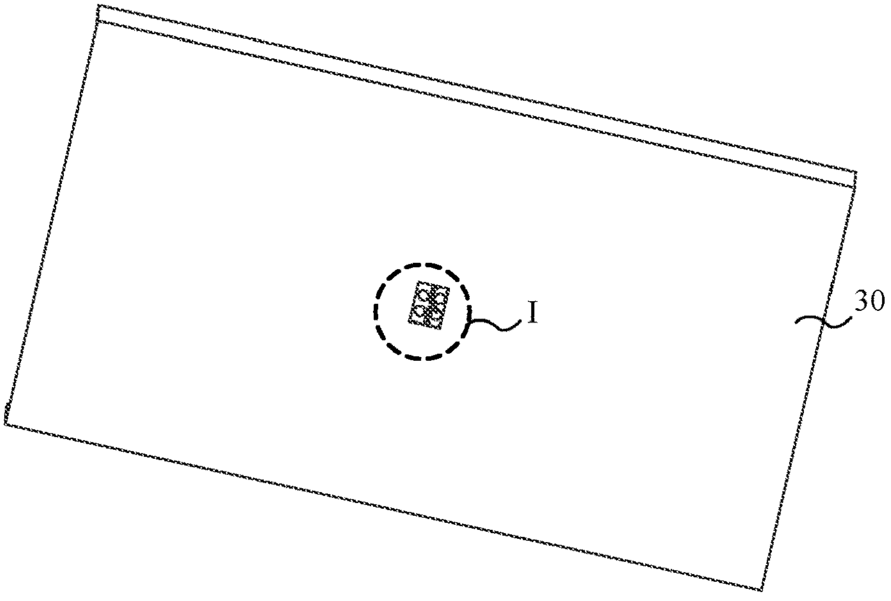
FIG. 11 is a diagram of a structure of an antenna apparatus from another perspective according to an embodiment of this disclosure.
Figure 12:
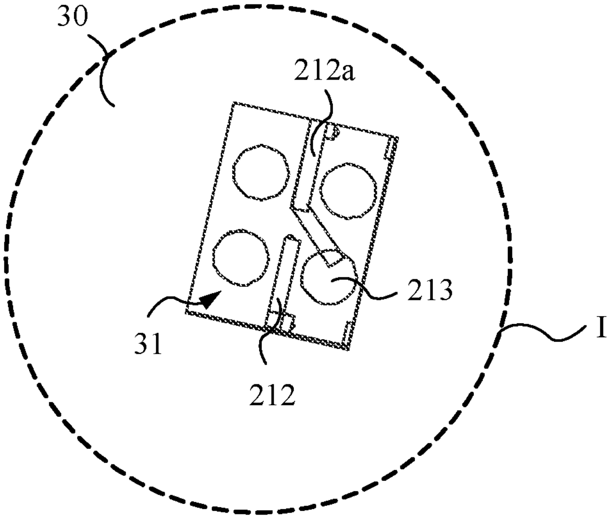
FIG. 12 is a partial enlarged diagram at I in FIG. 11.

FIG. 11 is a diagram of a structure of an antenna apparatus from another perspective according to an embodiment of this disclosure. FIG. 12 is a partial enlarged diagram at I in FIG. 11. Refer to FIG. 11 and FIG. 12. A reflection plate 30 may have a through hole 31, and in a feed network 20, an orthographic projection region of at least a part of a branch portion 212 and at least a part of an electrical connector 213 on the reflection plate 30 is located in the through hole 31.

It should be noted that an orthographic projection region of a component on the reflection plate 30 is a projection region of a component on the reflection plate 30 in a direction perpendicular to the reflection plate 30, that is, in a z direction.

Refer to FIG. 1. In an actual application, the reflection plate 30 is used as a reference ground of the antenna apparatus, and the reflection plate 30 and a transmission structure 21 of the feed network 20 may be disposed at an interval. In this way, the reflection plate 30 may be coupled to the transmission structure 21 of the feed network 20, to affect an amplitude of a radio frequency signal on the transmission structure 21.

For example, the reflection plate 30 may be coupled to a second electric-conductor 211*b* of a main portion 211, so that the second electric-conductor 211*b*, the reflection plate 30, and an air medium between the second electric-conductor 211*b* and the reflection plate 30 jointly form a microstrip structure.

Refer to FIG. 12. To avoid a case in which the reflection plate 30, two branch portions 212 that are led out of the main portion 211, and the electrical connectors 213 form a microstrip structure, affecting current amplitudes on the branch portion 212 and the corresponding electrical connectors 213, in this embodiment of this disclosure, the reflection plate 30 may have the through hole 31, and the orthographic projection region of at least the part of the branch portion 212 and at least the part of the electrical connector 213 on the reflection plate 30 in the feed network 20 is located in the through hole 31. In this way, at least the part of the branch portion 212 and at least the part of the electrical connector 213 are not coupled to the reflection plate 30 that serves as the reference ground, and it is ensured that current amplitudes on the two branch portions 212 and the corresponding electrical connectors 213 on one transmission structure 21 are equal, thereby ensuring that the transmission structure 21 transmits equi-amplitude phase-inverted radio frequency signals to two parts of a radiating element 10 by using the two branch portions 212 and the corresponding electrical connectors 213.

Refer to FIG. 12. In a specific implementation, an orthographic projection region of the four electrical connectors 213 and a part of branch portions 212 connected to the electrical connectors on the reflection plate 30 is located in the through hole 31. For example, an orthographic projection region of the four electrical connectors 213 and a part of a first branch portion 212*a* on the reflection plate 30 is located in the through hole 31, to ensure that current amplitudes of these parts are not affected by the reflection plate 30 and are not changed.

Figure 13:
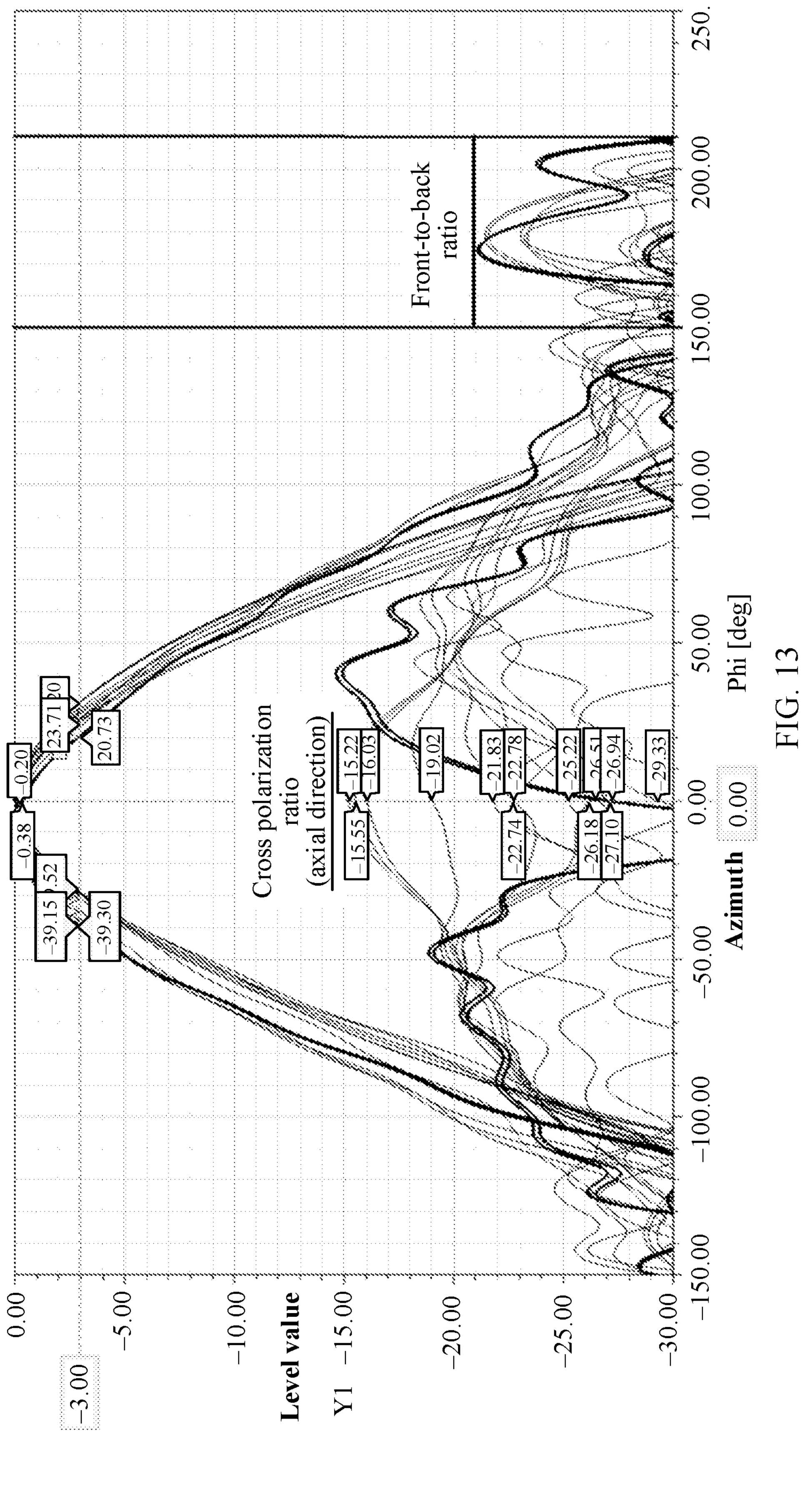
FIG. 13 is a simulation result diagram of an antenna directivity diagram of an antenna apparatus according to an embodiment of this disclosure.

FIG. 13 is a simulation result diagram of an antenna directivity diagram of an antenna apparatus according to an embodiment of this disclosure. Refer to FIG. 13. After the antenna directivity diagram of the antenna apparatus in this embodiment of this disclosure is simulated, a horizontal plane half-power beam width of the antenna apparatus is within a range of 65° (±5°), a cross polarization ratio (axial direction) is less than −15 dB, and a front-to-rear ratio is less than −21 dB. It indicates that in this embodiment of this disclosure, radiation performance of the antenna apparatus is ensured by disposing the foregoing feed network 20 in the antenna apparatus.

In addition, compared with a feed network 20 in a related technology, the feed network 20 in this embodiment of this disclosure has a simple line, to reduce a signal loss of the feed network 20, reduce a size of the feed network 20, reduce space occupied by the feed network 20 in the antenna apparatus, and provide proper space for the antenna apparatus to be disposed as an array antenna. That is, on the basis of improving integration of the antenna apparatus, miniaturization of the antenna apparatus is ensured. In addition, a structure of the feed network 20 in the antenna apparatus is also simplified, to improve manufacturing efficiency of the antenna apparatus.

The antenna apparatus in this embodiment of this disclosure may be a wideband antenna, or may be a narrowband antenna. For example, an operating frequency band of the antenna apparatus may be a frequency band of 1690 MHz to 2690 MHz or a frequency band of 690 MHz to 960 MHz.

In this embodiment of this disclosure, the foregoing antenna apparatus is disposed in the communication device such as a base station device. In one aspect, signal sending and receiving performance of the communication device is ensured. In another aspect, compared with the antenna apparatus in the related technology, the antenna apparatus in this embodiment of this disclosure has a simple structure, is easy to manufacture, and occupies small space. In this way, the array antenna may be disposed in the communication device, that is, integration of the communication device is improved on the basis of ensuring that a size of the communication device is within a proper range.

It should be understood that, in this application, "electrical connection" may be understood that components contact physically and conduct electrically. It may also be understood as a form in which different components in a line structure are connected through physical lines that can transmit an electrical signal, such as a printed circuit board (PCB) copper foil or a conducting wire. "Coupling" may be understood as conducting electrically through air in an indirect coupling manner. The coupling in this application may be understood as capacitive coupling. For example, an equivalent capacitor is formed by coupling between gaps of two electric-conductors, to implement signal transmission. A person skilled in the art may understand that a coupling phenomenon is a phenomenon that inputs and outputs of two or more circuit elements or electrical networks closely cooperate with each other and affect each other, and energy is transmitted from one side to the other side through interaction. A "communication connection" may be an electrical signal transmission, including a wireless communication connection and a wired communication connection. The wireless communication connection does not require a physical medium and does not belong to a connection relationship that defines a construction of a product. Both "connection" and "being connected to" may mean a mechanical connection relationship or a physical connection relationship, that is, a connection between A and B or that A is connected to B may mean that there is a fastening component (such as a screw, a bolt, or a rivet) between A and B, or A and B are in contact with each other and A and B are difficult to be separated.

In the descriptions of embodiments of this disclosure, it should be noted that, unless otherwise explicitly stipulated and restricted, terms "installation", "being connected to", and "connection" should be understood broadly, which, for example, may be a fixed connection, or may be an indirect connection by using a medium, or may be internal communication between two components, or may be an interaction relationship between two components. A person of ordinary skill in the art may understand specific meanings of the terms in embodiments of this disclosure based on specific cases.

In the specification, claims, and accompanying drawings of embodiments of this disclosure, the terms "first", "second", "third", "fourth", and the like (if existent) are intended to distinguish between similar objects but do not necessarily indicate a specific order or sequence.

What is claimed is:

1. A feed network, comprising a transmission structure, wherein the transmission structure comprises a main portion and two branch portions, the main portion has a first electric-conductor and a second electric-conductor that are disposed opposite to each other, and the first electric-conductor is spaced from the second electric-conductor by a space; and the two branch portions comprise a first branch portion and a second branch portion, wherein one end of the first branch portion is electrically connected to one end of the first electric-conductor, and the other end of the first branch portion is electrically connected to a first radiation part of a radiating element in an antenna apparatus, to feed a radio frequency signal into the first radiation part; one end of the second branch portion is electrically connected to the second electric-conductor, and the other end of the second branch portion is electrically connected to a second radiation part of the radiating element, to feed a radio frequency signal into the second radiation part; and the first radiation part and the second radiation part are two radiation parts in a same polarization direction in the radiating element.

2. The feed network of claim 1, wherein the main portion comprises a microstrip, the first electric-conductor is an inner conductor of the microstrip, and the second electric-conductor is an outer conductor of the microstrip.

3. The feed network of claim 2, the feed network further comprising a substrate, wherein the substrate comprises a first surface and a second surface that are disposed opposite to each other, the first electric-conductor is located on the first surface, the second electric-conductor is located on the second surface, a part of the first branch portion and a part of the second branch portion are located on the first surface, and the other part of the first branch portion and the other part of the second branch portion are located on the second surface.

4. The feed network of claim 1, wherein the first branch portion comprises a first part and a second part, one end of the first part is electrically connected to the first electric-conductor, the other end of the first part is electrically connected to the second part, and the other end of the second part is electrically connected to the first radiation part; and a projection of the first part and a projection of the second electric-conductor overlap in a direction perpendicular to the substrate of the feed network, and a projection of the second part and the projection of the second electric-conductor are staggered in the direction perpendicular to the substrate.

5. The feed network of claim 1, wherein the second branch portion comprises a third part and a fourth part, the third part is electrically connected to the second electric-conductor, one end of the fourth part is electrically connected to the third part, and the other end of the fourth part is electrically connected to the second radiation part; and a projection of the third part and the projection of the second electric-conductor overlap in the direction perpendicular to the substrate of the feed network, and a projection of the fourth part and the projection of the second electric-conductor are staggered in the direction perpendicular to the substrate.

6. The feed network of claim 1, wherein the transmission structure further comprises two electrical connectors;

the two electrical connectors and the two branch portions are correspondingly disposed, each electrical connector is electrically connected to an end that is of a corresponding branch portion and that is away from the main portion, and a corresponding part in the radiating element is electrically connected to a corresponding electrical connector; and a size of each electrical connector in an extension direction perpendicular to the branch portion is greater than a width of the branch portion.

7. The feed network of claim 6, wherein each electrical connector comprises two electrical sub-connectors disposed opposite to each other in the direction perpendicular to the substrate, one electrical sub-connector is disposed on the first surface of the substrate, and the other electrical sub-connector is disposed on the second surface of the substrate; and the two electrical sub-connectors are electrically connected, and the radiating element is electrically connected to any electrical sub-connector in the corresponding electrical connector.

8. The feed network of claim 1, wherein the feed network comprises two transmission structures;

the two transmission structures comprise a first transmission structure and a second transmission structure;

the first transmission structure comprises a first electrical connector and a third electrical connector, the first electrical connector is electrically connected to a first branch portion of the first transmission structure, the third electrical connector is electrically connected to a second branch portion of the first transmission structure, the second transmission structure comprises a second electrical connector and a fourth electrical connector, the second electrical connector is electrically connected to a first branch portion of the second transmission structure, and the fourth electrical connector is electrically connected to a second branch portion of the second transmission structure; and the first electrical connector, the second electrical connector, the third electrical connector, and the fourth electrical connector are sequentially arranged in a ring shape.

9. The feed network of claim 1, wherein the second branch portion and the first part of the first branch portion are located on the first surface of the substrate of the feed network; and at least a part of the second part of the first branch portion is located on the second surface of the substrate.

10. The feed network of claim 9, wherein the second part of the first branch portion comprises a first extension portion and a first bent portion; and one end of the first extension portion is electrically connected to the first part of the first branch portion, the other end of the first extension portion is electrically connected to one end of the first bent portion, and the other end of the first bent portion is electrically connected to the first radiation part.

11. The feed network of claim 10, wherein at least a part of the first bent portion and at least a part of the second branch portion are located between the third electrical connector and the second electrical connector of the feed network; and at least a part of the first bent portion is located on the second surface.

12. The feed network of claim 10, wherein the fourth part of the second branch portion comprises a second extension portion and a second bent portion, a first end of the second extension portion is connected to the third part of the second branch portion, a second end of the second extension portion is connected to the second bent portion, and the other end of the second bent portion is electrically connected to the second radiation part.

13. The feed network of claim 12, wherein the second bent portion and the first bent portion have an overlapping region in the direction perpendicular to the substrate, and the overlapping region is located between the second electrical connector and the third electrical connector of the feed network, or the overlapping region is located between the first electrical connector and the fourth electrical connector of the feed network.

14. An antenna apparatus, comprising a radiating element, and a feed network comprising a transmission structure that is electrically connected to the radiating element, wherein the transmission structure comprises a main portion and two branch portions, the main portion has a first electric-conductor and a second electric-conductor that are disposed opposite to each other, and there is a spacing between the first electric-conductor and the second electric-conductor; and the two branch portions comprise a first branch portion and a second branch portion, wherein one end of the first branch portion is electrically connected to one end of the first electric-conductor, and the other end of the first branch portion is electrically connected to a first radiation part of a radiating element in an antenna apparatus, to feed a radio frequency signal into the first radiation part; one end of the second branch portion is electrically connected to the second electric-conductor, and the other end of the second branch portion is electrically connected to a second radiation part of the radiating element, to feed a radio frequency signal into the second radiation part; and the first radiation part and the second radiation part are two radiation parts in a same polarization direction in the radiating element.

15. The antenna apparatus of claim 14, wherein the antenna apparatus further comprises a reflection plate;

both the feed network and the radiating element are located on a same side of the reflection plate; and the reflection plate has a through hole, and in the feed network, an orthographic projection region of at least a part of a branch portion and at least a part of an electrical connector on the reflection plate is located in the through hole.

16. The antenna apparatus of claim 14, wherein the main portion comprises a microstrip, the first electric-conductor is an inner conductor of the microstrip, and the second electric-conductor is an outer conductor of the microstrip.

17. The antenna apparatus of claim 14, wherein the second branch portion comprises a third part and a fourth part, the third part is electrically connected to the second electric-conductor, one end of the fourth part is electrically connected to the third part, and the other end of the fourth part is electrically connected to the second radiation part; and a projection of the third part and the projection of the second electric-conductor overlap in the direction perpendicular to the substrate of the feed network, and a projection of the fourth part and the projection of the second electric-conductor are staggered in the direction perpendicular to the substrate.

18. The antenna apparatus of claim 14, wherein both the second branch portion and the first part of the first branch portion are located on the first surface of the substrate of the feed network; and at least a part of the second part of the first branch portion is located on the second surface of the substrate.

19. A communication device, comprising the antenna apparatus, wherein the antenna apparatus comprises a radiating element and a feed network comprising a transmission structure, wherein the radiating element is electrically connected to the transmission structure, the transmission structure comprises a main portion and two branch portions, the main portion has a first electric-conductor and a second electric-conductor that are disposed opposite to each other, and the first electric-conductor is spaced from the second electric-conductor by a space; and the two branch portions comprise a first branch portion and a second branch portion, wherein one end of the first branch portion is electrically connected to one end of the first electric-conductor, and the other end of the first branch portion is electrically connected to a first radiation part of a radiating element in an antenna apparatus, to feed a radio frequency signal into the first radiation part; one end of the second branch portion is electrically connected to the second electric-conductor, and the other end of the second branch portion is electrically connected to a second radiation part of the radiating element, to feed a radio frequency signal into the second radiation part; and the first radiation part and the second radiation part are two radiation parts in a same polarization direction in the radiating element.

20. The communication device of claim 19, the antenna apparatus further comprising a reflection plate, wherein the feed network and the radiating element are located on a same side of the reflection plate; and the reflection plate has a through hole, and in the feed network, an orthographic projection region of at least a part of a branch portion and at least a part of an electrical connector on the reflection plate is located in the through hole.

* * * * *